(12) United States Patent
Sato et al.

(10) Patent No.: US 6,239,944 B1
(45) Date of Patent: May 29, 2001

(54) DISC CARTRIDGE AND DUST-PROOFING SYSTEM IN DISC DRIVE SYSTEM

(75) Inventors: Kunio Sato, Fukushima; Yuji Suzuki, Kanagawa, both of (JP)

(73) Assignees: Sony Corporation; Alps Electric Co, Ltd., both of Tokyo (JP)

(*) Notice: Subject to any disclaimer, the term of this patent is extended or adjusted under 35 U.S.C. 154(b) by 0 days.

(21) Appl. No.: 09/417,084

(22) Filed: Oct. 13, 1999

(30) Foreign Application Priority Data

Oct. 14, 1998 (JP) ............................................ 10-292333

(51) Int. Cl.$^7$ ............................................ G11B 17/02
(52) U.S. Cl. ............................................ 360/97.02
(58) Field of Search ............................ 360/97.01, 97.02, 360/97.04, 99.02, 99.03, 99.06, 99.07; 369/75.1, 77.2

(56) References Cited

U.S. PATENT DOCUMENTS

| 5,220,552 | | 6/1993 | Yokoi et al. | 369/77.2 |
|---|---|---|---|---|
| 5,748,420 | * | 5/1998 | Ko et al. | 360/133 |
| 5,748,595 | * | 5/1998 | Nakajima | 360/99.06 |
| 5,787,063 | | 7/1998 | Kanno et al. | 369/77.2 |
| 5,886,659 | | 3/1999 | Pain et al. | 341/155 |
| 5,898,660 | * | 4/1999 | Serizawa | 360/96 |
| 5,940,255 | * | 8/1999 | Uwabo et al. | 360/133 |
| 6,122,140 | * | 9/2000 | Sato | 360/99.02 |
| 6,137,770 | * | 10/2000 | Fujisawa | 360/133 |

FOREIGN PATENT DOCUMENTS

| 58169378 | 10/1983 | (EP) . |
|---|---|---|
| 0134419 | 3/1985 | (EP) . |
| 61289586 | 12/1986 | (EP) . |
| 5036234 | 2/1993 | (EP) . |
| 9844504 | 10/1998 | (WO) . |

* cited by examiner

Primary Examiner—Robert S. Tupper
(74) Attorney, Agent, or Firm—Jay H. Maioli

(57) ABSTRACT

A disc cartridge which includes a dust-proofing mechanism having a dust-proofing panel, a dust-proofing arm and a dust-proofing plate which are arranged facing the major surface, bottom surface and both lateral surfaces of the disc cartridge loaded in position to prohibit intrusion of dust and dirt into the inside of the device via a cartridge insertion and/or removal opening. The disc cartridge includes a main cartridge body unit having a detection hole for detecting a second disc housed in the disc cartridge on insertion of a detection switch provided on the device. The detection hole is formed so that its one end in the depth-wise direction is closed. The detection hole is formed to a depth such that an actuator of the detection switch is not abutted on the hole bottom. This prohibits dust and dirt from being intruded into the main body unit of the disc drive device.

5 Claims, 18 Drawing Sheets

DISC CARTRIDGE AND DUST-PROOFING SYSTEM IN DISC DRIVE SYSTEM

BACKGROUND OF THE INVENTION

1. Field of the Invention

This invention relates to a disc cartridge for housing a disc-shaped recording medium, such as a magnetic disc, and a dust-proofing system having the disc cartridge and a disc drive device for recording and/or reproducing the information for this disc cartridge.

2. Description of the Related Art

There has so far been known a disc cartridge rotationally housing a magnetic disc in its main body unit. Among known disc cartridges of this type, adapted to be removable, there is, for example, a disc cartridge having, as an information recording medium, a magnetic disc, 3.5 inch in diameter, having a signal recording layer on a flexible disc substrate, that is, a so-called flexible disc.

A disc drive device, loaded with this type of the disc cartridge and adapted to record and/or reproduce information signals for the magnetic disc, includes a head mechanism for supporting a head unit having a magnetic head element adapted for recording and/or reproducing information signals for the signal recording surface of the magnetic disc. The disc drive device also includes a movement mechanism for causing movement of the head unit via head mechanism along the radial direction of the magnetic disc, and a disc rotating and driving mechanism having a disc table on which to set the magnetic disc and a spindle motor for rotationally driving the disc table.

The disc drive device also includes a front panel having a cartridge insertion and/or removal opening via which to insert or remove the disc cartridge with respect to the main body unit of the device. The front panel includes an opening and/or closure door adapted for opening or closing the cartridge insertion and/or removal opening. This opening and/or closure door is rotatable towards the inside of the device and closes the cartridge insertion and/or removal opening in a state in which the disc cartridge is not loaded within the main body unit of the device.

If, in the disc drive device, constructed as described above, the disc cartridge inserted via the cartridge insertion and/or removal opening of the front panel, is loaded within the main body unit, the magnetic disc in the disc cartridge is set on the disc table and run in rotation. A head unit of the head mechanism then is moved by a movement mechanism along the radial direction of the head unit to record and/or reproduce the information signals for the magnetic disc by the head unit.

Meanwhile, with the recent trend towards the larger capacity of information signals, there has been proposed a large-capacity disc cartridge housing therein a magnetic disc improved in recording density so as to have a recording capacity of from tens to hundreds of megabyte in comparison with the conventional recording capacity of 2 megabyte. This large-capacity disc is referred to below as the large-capacity disc.

In the large-capacity disc, housed in the large-capacity disc cartridge, the track pitch and the track width are reduced to improve the density of recording tracks formed on the signal recording surface. Thus, the large-capacity disc suffers from the problem that, if fine dust and dirt have become affixed to the signal recording surface, the information signals cannot be recorded and/or reproduced accurately.

In this type of the large-capacity disc cartridge, a mistaken recording inhibiting hole is formed in a main cartridge body unit housing the large-capacity disc for controlling overwriting of information signals on the large-capacity disc. The large-capacity disc cartridge also has a detection hole adapted to be detected by detection means provided on a disc drive device of different specifications on loading the disc cartridge on this disc drive device of the different specifications for inhibiting recording of the information signals on the large-capacity disc to prohibit inadvertent erasure of information signals recorded to high density on the large-capacity disc.

In the above-described conventional large-capacity disc cartridge, the mistaken recording inhibiting hole and the detection hole are bored in the upper and lower cartridge halves, making up the main cartridge body unit, so that both ends of the holes are opened in the major surfaces of the upper and lower cartridge halves. In this type of the large-capacity disc cartridge, since the opening and/or closure door of the cartridge insertion and/or removal opening of the main cartridge body unit is rotated towards the inside of the main body unit of the device so that an end of the opening and/or closure door is abutted against the major surface of the main cartridge body unit, there is raised a problem that the cartridge opening and/or closure door is left open during recording and/or reproduction.

Therefore, in the above-described disc cartridge, since the mistaken recording inhibiting hole and the detection hole are proximate to the cartridge insertion and/or removal opening on loading the disc cartridge in the main body unit of the disc drive device, dust and dirt intruded via the cartridge insertion and/or removal opening, opened to outside of the disc drive device, are intruded via one opening ends of the mistaken recording inhibiting hole and the detection hole and via the insides of the holes and the other opening ends of the holes to turn around over and become affixed to the signal recording surface of the large-capacity disc within the main cartridge body unit to produce errors in the recording and/or reproducing operation for information signals.

SUMMARY OF THE INVENTION

It is therefore an object of the present invention to provide a disc cartridge whereby it is possible to reliably prevent intrusion of dust and dirt into the inside of the main body unit of a disc drive device via the insertion and/or removal opening via which the disc cartridge is inserted into or removed from the disc drive device.

It is another object of the present invention to provide a dust-proofing mechanism in a disc drive system having the disc drive device and the disc cartridge whereby it is possible to reliably prevent intrusion of dust and dirt into the main body unit of the disc drive device.

In one aspect, the present invention provides a disc cartridge for loading on a disc drive device, the disc drive device including a main body unit, which main body unit includes an inserting and/or removal portion having an insertion and/or removal opening via which a disc cartridge housing a disc-shaped recording medium therein is inserted or removed, and a cartridge holder for holding the disc cartridge, arranged for movement between an inserting and/or removal position enabling the disc cartridge to be inserted into and removed from the main body unit via the inserting and/or removal portion and a loading position enabling the information signals to be recorded and/or reproduced for the disc-shaped recording medium, and a dust-proofing mechanism having a dust-proofing member for the major surface of the disc cartridge, a dust-proofing member for the bottom surface of the disc cartridge and a dust-proofing member for the lateral surfaces of the disc cartridge, arranged facing the major surface, lateral surfaces and the bottom surface of the disc cartridge mounted at the cartridge loading position, respectively, for prohibiting intrusion of dust and dirt via the insertion and/or removal opening into the main cartridge body unit. According to the present invention, there is provided a main cartridge body unit having a detection hole for detecting the specifications of the disc-shaped recording medium housed therein on insertion of detection means provided on the disc drive device. The detection hole has its end along its depth-wise direction closed so as to have a depth to prohibit the detection means inserted therein from abutting against the bottom thereof.

In another aspect, the present invention provides a disc cartridge including an upper cartridge half and a lower cartridge half, together forming a cartridge half pair, and constituting together a main cartridge body unit in which to accommodate a disc-shaped recording medium, a shutter mounted on the main cartridge body unit for opening and/or closing an aperture formed in the main cartridge body unit, and a detection hole provided in the main cartridge body unit and into which is inserted detection means provided on a disc drive device for detecting the specifications of the disc-shaped recording medium housed therein. The detection hole has its end along its depth-direction closed and is of a depth such that the detecting means inserted therein is not abutted against its bottom.

In yet another aspect, the present invention provides a dust-proofing mechanism in a disc drive system, which disc drive system includes a main body unit having an inserting and/or removal portion having in turn an insertion and/or removal opening via which a disc cartridge housing a disc-shaped recording medium therein is inserted or removed, a cartridge holder for holding the disc cartridge, arranged for movement between an inserting and/or removal position enabling the disc cartridge to be inserted into and removed from the main body unit via the inserting and/or removal portion and a loading position enabling the information signals to be recorded and/or reproduced for the disc-shaped recording medium, and a dust-proofing member for the major surface of the disc cartridge, a dust-proofing member for the lateral surfaces of the disc cartridge and a dust-proofing member for the bottom surface of the disc cartridge, arranged facing the major surface, lateral surfaces and the bottom surface of the disc cartridge, mounted at the cartridge loading position, respectively, for prohibiting intrusion of dust and dirt via the insertion and/or removal opening into the main cartridge body unit. The disc cartridge has a main cartridge body unit including a detection hole for detecting the specifications of the disc-shaped recording medium housed therein on insertion of detection means provided on the disc drive device. The detection hole has its end along its depth-wise direction closed so as to have a depth sufficient to prohibit the detection means inserted therein from abutting against the bottom thereof.

With the present disc cartridge according to the present invention, it is possible to prevent dust and dirt intruded via the cartridge insertion and/or removal opening on loading the disc cartridge at a pre-set loading position in the disc drive device from passing through the detection hole in the main cartridge body unit to enter the inside of the device.

With the dust-proofing mechanism in the disc drive device according to the present invention, it is possible to prohibit dust and dirt from being intruded from the cartridge insertion and/or removal opening into the inside of the disc drive device on loading the disc cartridge at a pre-set loading position within the disc drive device.

DESCRIPTION OF THE PREFERRED EMBODIMENTS

Figure 1:
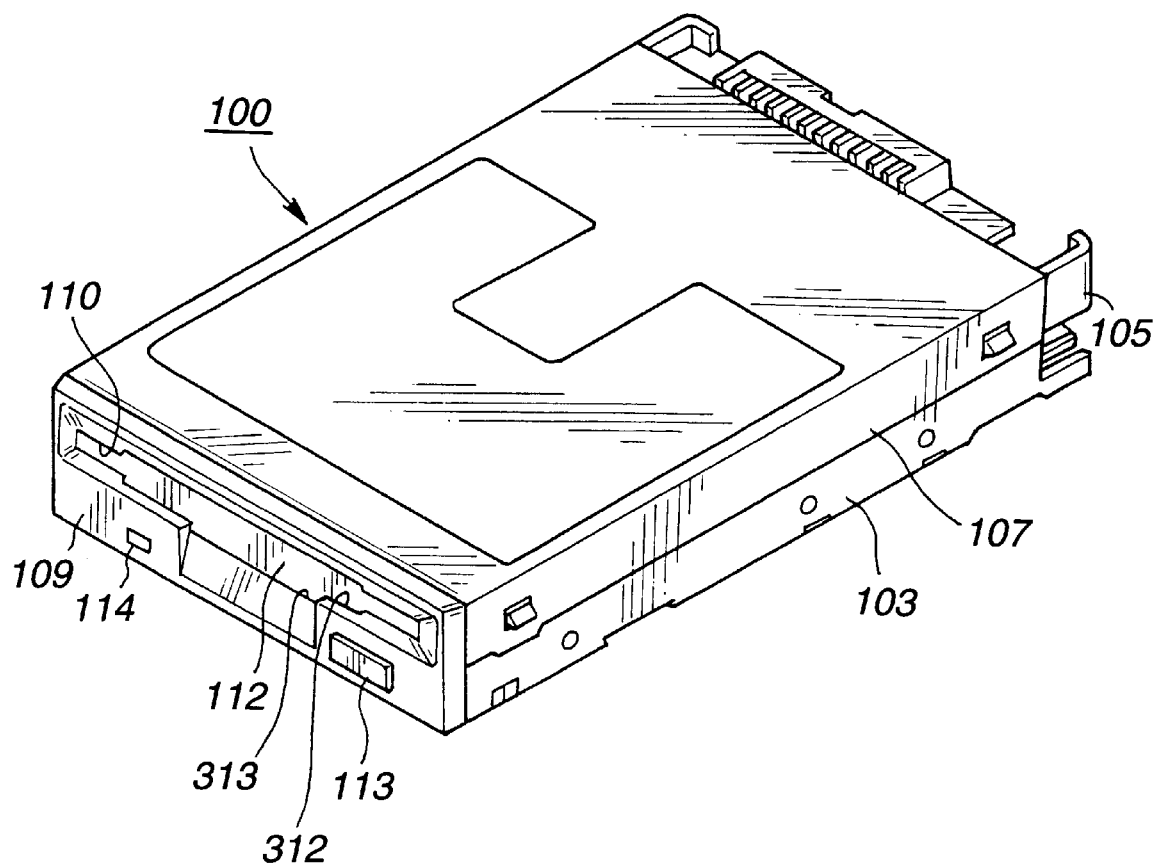
FIG. 1 is a perspective view showing a disc drive device into which is loaded a disc cartridge according to the present invention.

Referring to the drawings, a disc drive device 100 and a disc cartridge used in this disc drive device are explained in detail. The disc drive device 100, shown in FIG. 1, is designed so that a disc cartridge housing therein a magnetic disc as information recording medium is inserted into or removed from the main body unit of the disc drive device 100. The device 100 records and/or reproduces information signals selectively using one of the first disc cartridge housing therein a first magnetic disc adapted for recording and/or reproducing information signals at a first recording density or a second disc cartridge housing therein a second magnetic disc adapted for recording and/or reproducing information signals at a second recording density higher than the first recording density.

Before proceeding to description of the disc drive device 100 according to the present invention, the first and second disc cartridges, used for the present disc drive device 100, are respectively explained. The magnetic disc housed in the first or second disc cartridge is of a diameter of 3.5 inches.

A first disc cartridge 5 records information signals at a first recording density and houses a first magnetic disc 6 having a recording capacity of the order of 2 megabytes and on which information signals are recorded at a first recording density. The first magnetic disc 6, housed in the first disc cartridge 5, has a disc substrate 7 of flexible synthetic resin. On both major surfaces of the disc substrate 7 are deposited magnetic layers to constitute signal recording surfaces. In the center of the disc substrate 7 is bored a circular center opening and a hub 8 is mounted on the disc substrate 7 to close the center opening. The hub 8 is formed of a magnetic material, such as stainless steel or iron, and is mounted on the disc substrate 7 by having its tubular protrusion fitted in the center opening and by having a flange provided on the outer rim of the protrusion bonded to the rim of the center opening. In the center of the hub 8 is bored a rectangular spindle hole 8a passed through by a spindle of a disc rotating and driving mechanism provided on the disc drive device 100. At a position offset from the center portion of the hub 8 is formed a rectangular driving pin engagement hole 8b engaged by a driving pin provided on the disc rotating and driving mechanism.

Figure 2:
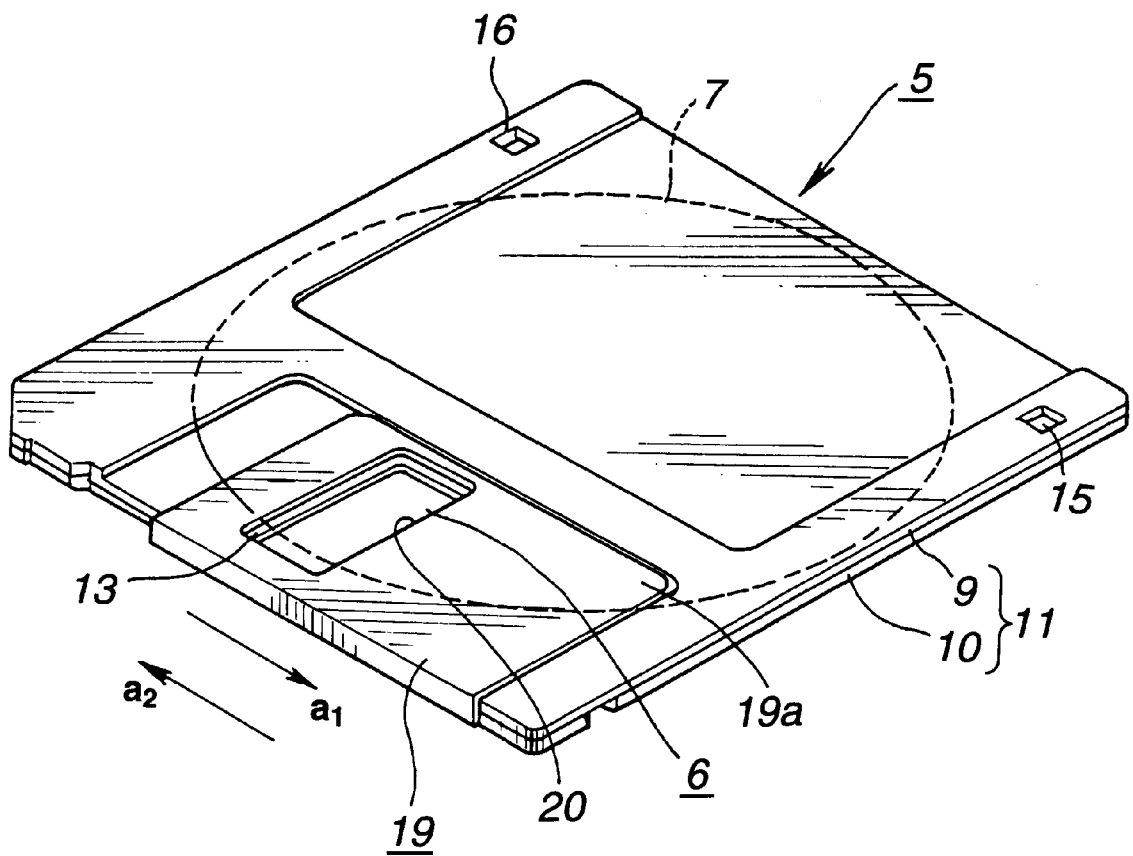
FIG. 2 is a perspective view of a first disc cartridge loaded on the disc drive device.
Figure 3:
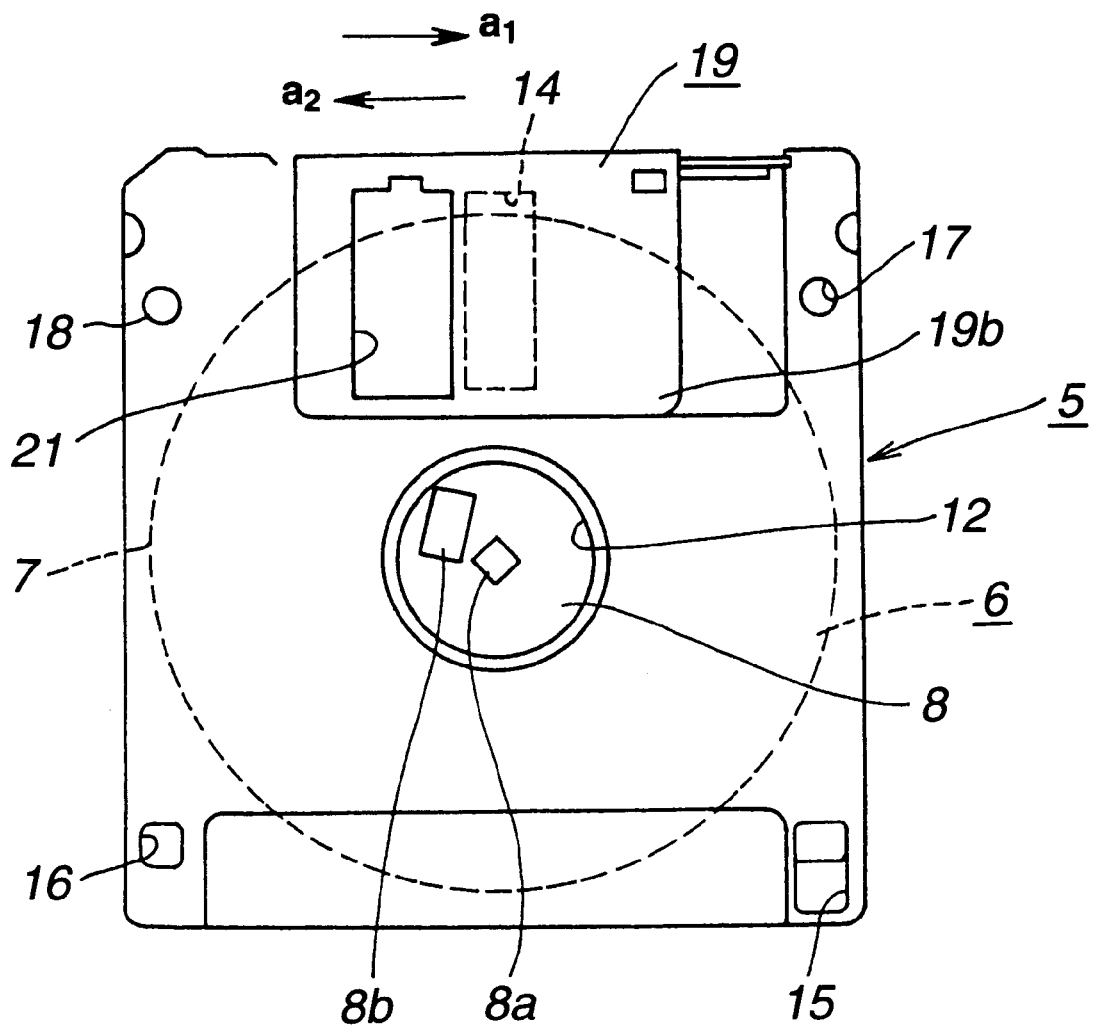
FIG. 3 is a bottom plan view of the first disc cartridge.

The first magnetic disc 6, constructed as described above, is rotationally housed in a main cartridge body unit 11 formed by abutting and interconnecting upper and lower cartridge halves 9, 10. At a mid portion in the lower surface of the main cartridge body unit 11 housing the first magnetic disc 6 is formed a circular center opening 12 into which is intruded the disc table constituting the disc rotating and driving mechanism, as shown in FIG. 3. In the upper and lower major surfaces of the main cartridge body unit 11 are formed rectangular recording and/or reproducing apertures 13, 14 in register with each other, as shown in FIGS. 2 and 3. These apertures 13, 14 are located at the center position along the left-and-right direction of the main cartridge body unit 11 and are formed for extending from the vicinity of the center opening 12 up to the front side of the main cartridge body unit 11. With the first magnetic disc 6 housed within the main cartridge body unit 11, a signal recording area of the disc is exposed to outside across its inner and outer rims via the recording and/or reproducing apertures 13, 14. At a corner towards the back surface of the main cartridge body unit 11, there is bored a mistaken recording inhibiting hole 15 for regulating the overwriting of information signals on the first magnetic disc 6 housed therein. On the opposite side corner to the mistaken recording inhibiting hole 15, in the lower major surface of the main cartridge body unit 11, there is bored a disc discriminating hole 16 for indicating the specifications of the magnetic disc housed in the main cartridge body unit 11. By detecting this disc discriminating hole 16, it may be discriminated that the magnetic disc 6 housed in the main cartridge body unit 11 has the recording capacity of 2 megabytes.

In the lower major surface of the first disc cartridge 5, there are bored positioning pin engagement holes 17, 18 for positioning the first disc cartridge 5 at the cartridge loading position on the disc drive device 100 when the first disc cartridge 5 is loaded on the disc drive device 100, as shown in FIG. 3. These positioning pin engagement holes 17, 18 are provided on both sides of the recording and/or reproducing apertures 13, 14, as shown in FIG. 3.

On the first disc cartridge 5, there is mounted a shutter member 19 for opening and/or closing the recording and/or reproducing apertures 13, 14, as shown in FIGS. 2 and 3. The shutter member 19, formed to a U-shaped cross-section by a metal sheet of, for example, aluminum or stainless steel, or on molding synthetic resin, is fitted from the front side of the main cartridge body unit 11 to overlie the recording and/or reproducing apertures 13, 14, and is adapted to be moved in the direction indicated by arrows a1 and a2 in FIGS. 2 and 3 for opening and/or closing the apertures 13, 14. In shutter portions 19a, 19b of the shutter member 19 extended over the upper and lower surfaces of the main cartridge body unit 11, there are formed rectangular cut-outs 20, 21 in register with the apertures 13, 14 for opening the apertures 13, 14 when the shutter member 19 is moved in the direction indicated by arrow a1 in FIGS. 2 and 3 to a position of opening the apertures.

The shutter member 19 is biased by a spring member, not shown, provided within the main cartridge body unit 11, in the direction indicated by arrow a2 in FIGS. 2 and 3, for closing the recording and/or reproducing apertures 13, 14.

Figure 4:
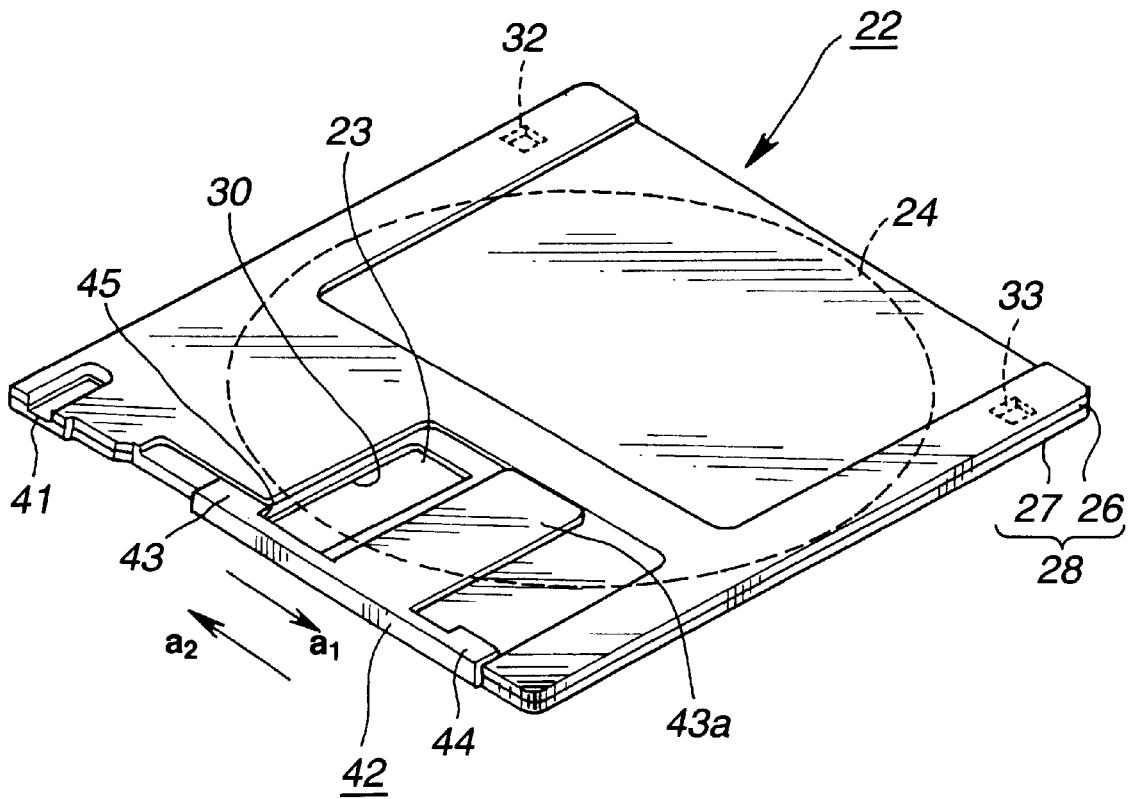
FIG. 4 is a perspective view of a second disc cartridge loaded on the disc drive device.
Figure 5:
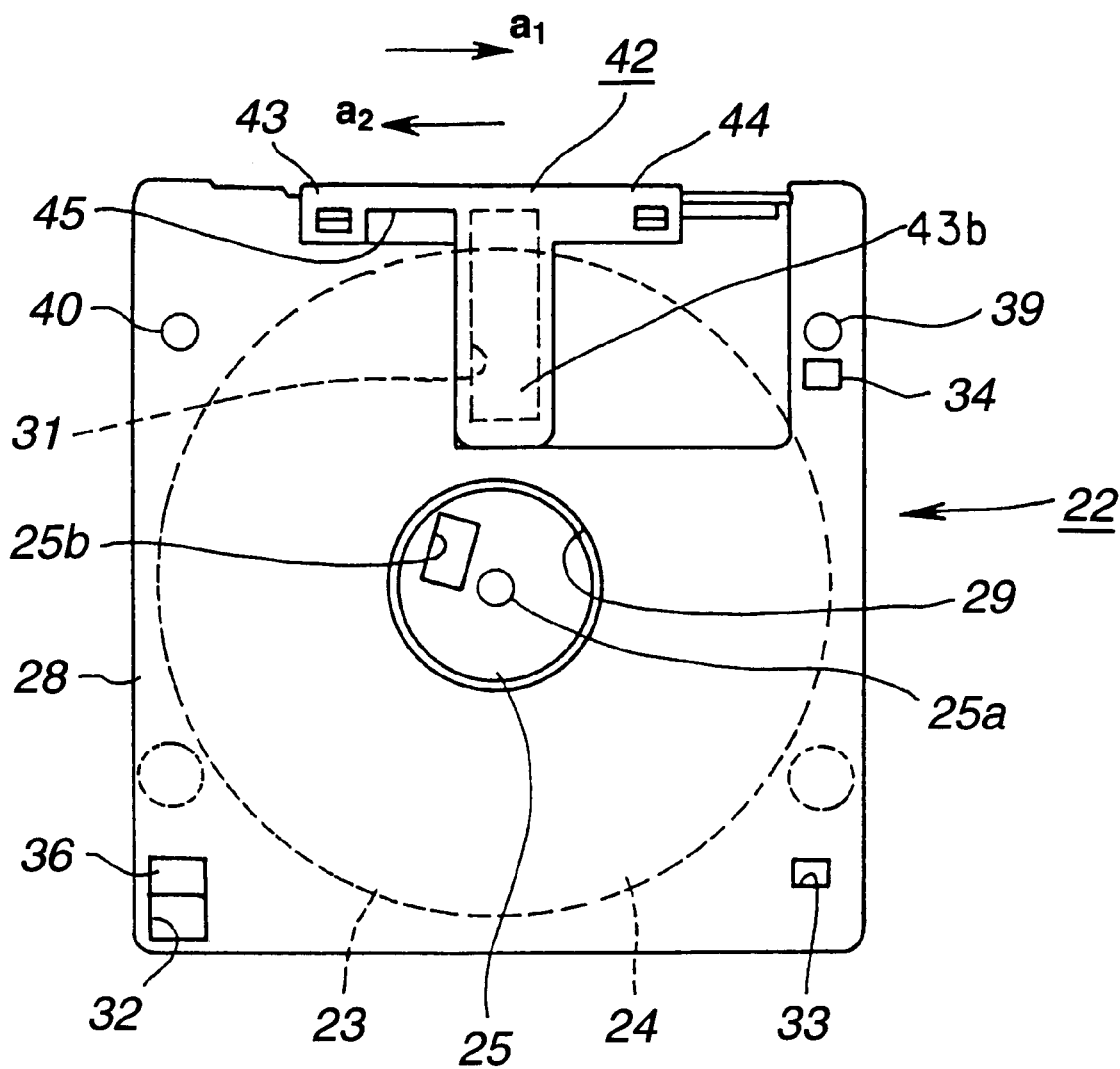
FIG. 5 is a bottom plan view of the second disc cartridge.

A second disc cartridge 22, housing therein a second magnetic disc 23, adapted for recording information signals at a second recording density higher than that of the above-described first magnetic disc 6, is common in size and thickness to the above-described first disc cartridge 5, as shown in FIGS. 4 and 5.

Similarly to the above-described first magnetic disc 6, the second magnetic disc 23, housed in the second disc cartridge 22, has a disc substrate 24 of a flexible synthetic resin, on both sides of which magnetic layers are deposited to form signal recording portions. In the center of the disc substrate 24 is bored a circular center opening and a hub 25 is mounted to close this center opening. The hub 25 is formed of a magnetic material, such as stainless steel or iron, and is mounted on the disc substrate 23 by having its tubular protrusion fitted in the center opening and by having a flange on the outer rim of the protrusion bonded to the rim of the center opening. In the center of the hub 25 is bored a rectangular spindle hole 25a passed through by a spindle of a disc rotating and driving mechanism provided on the disc drive device 100. At a position offset from the center portion of the hub 25 is formed a rectangular driving pin engagement hole 25b engaged by a driving pin provided on the disc rotating and driving mechanism.

The second magnetic disc 23, constructed as described above, is designed to have a recording capacity not less than 100 megabytes, preferably a recording capacity not less than 200 megabyte. The second magnetic disc 23 is rotationally housed in a main cartridge body unit 28 formed on abutting and interconnecting the upper and lower cartridge halves 26, 27. At a mid portion in the lower surface of the main cartridge body unit 28 housing, the second magnetic disc 23 is formed a circular center opening 29 into which is intruded the disc table constituting the disc rotating and driving mechanism, as shown in FIG. 5. In the upper and lower major surfaces of the main cartridge body unit 11 are formed rectangular recording and/or reproducing apertures 30, 31 in register with each other, as shown in FIGS. 4 and 5. These apertures 30, 31 are located at the center position along the left-and-right direction of the main cartridge body unit 28 and are formed for extending from the vicinity of the center opening 29 up to the front side of the main cartridge body unit 28. With the second magnetic disc 23 housed within the main cartridge body unit 28, a signal recording area of the second magnetic disc 23 is exposed to outside across the inner and outer rims of the disc.

Meanwhile, with the second magnetic disc 23, its signal recording area extends up to the vicinity of its outer rim in order to realize the high recording capacity. The recording and/or reproducing apertures 30, 31 are larger in size than the recording and/or reproducing apertures 13, 14 formed in the first disc cartridge 5, in order that the signal recording area of the second magnetic disc 23, formed to the vicinity of its outer rim, will face the outer side of the main cartridge body unit 28 so as to be accessible by the head unit 121 of the disc drive device 100. That is, the recording and/or reproducing apertures 30, 31, provided in the second disc cartridge 22, are extended to the vicinity of the front side of the main cartridge body unit 28, as shown in FIG. 4.

In the opposite side corner of the rear side of the main cartridge body unit 28, there is formed a mistaken recording inhibiting hole 32 there is bored a mistaken recording inhibiting hole 15 for regulating the overwriting of information signals on the second magnetic disc 23 housed therein. The mistaken recording inhibiting hole 32 is provided at a reversed position to that provided in the first disc cartridge 5 and is designed so that a mistaken recording inhibiting member 36 is movable therein. At the opposite side corner to the mistaken recording inhibiting hole 32, in the lower major surface of the main cartridge body unit 11, there is bored a detection hole 33, as shown in FIG. 5. This detection hole 33 is provided in register with the mistaken recording inhibiting hole 15 of the first disc cartridge 5, so that, when the main cartridge body unit 28 is loaded on a disc drive device employing only the first disc cartridge 5, the detection hole 33 is detected by a mistaken recording detection mechanism of the disc drive device to inhibit the recording of information signals on the second magnetic disc 23 to prevent inadvertent erasure of the information signals recorded on the second magnetic disc 23.

In the lower surface of the main cartridge body unit 28, there are bored positioning pin engagement holes 39, 40 for positioning the second disc cartridge 22 at the cartridge loading position on the disc drive device 100 when the second disc cartridge 22 is loaded on the disc drive device 100, as shown in FIG. 5. These positioning pin engagement holes 39, 40 are provided on both sides of the recording and/or reproducing apertures 30, 31, as shown in FIG. 5. In the lower surface of the main cartridge body unit 28, there is bored a disc discriminating hole 34 adjacent to the positioning pin engagement hole 39 for indicating that the second magnetic disc 23 housed in the main cartridge body unit 28 is the large-capacity disc having the recording capacity of, for example, 200 megabytes.

At a corner towards the front side in the upper surface of the main cartridge body unit 28, provided with the recording and/or reproducing apertures 30, 31, there is formed a groove 41 for mistaken insertion inhibition by regulating the direction of insertion into the disc drive device 100.

On the second disc cartridge 22, there is mounted a shutter member 42 for opening and/or closing the recording and/or reproducing apertures 30, 31, as in the case of the first disc cartridge 5. This shutter member 42 similarly is formed by a sheet of a metal material, such as aluminum or stainless steel, or on molding synthetic resin.

The shutter member 42, provided on the second disc cartridge 22, has shutter portions 43a, 43b sized to be large enough to cover the recording and/or reproducing apertures 30, 31, and shutter supporting portions 43, 44, each being of a U-shaped cross-section, for supporting the shutter member 42 by the main cartridge body unit 28. The shutter supporting portions 43, 44 are protuberantly formed on both sides of the proximal ends of the shutter portions 43a, 43b. The shutter member 42 is substantially in the form of a letter T in its entirety.

The recording and/or reproducing apertures 30, 31, provided on the second disc cartridge 22, are formed up to the vicinity of the front side of the main cartridge body unit 28, in order to permit the signal recording area, formed up to the vicinity of the outer rim of the second magnetic disc 23, to be exposed to outside of the main cartridge body unit 23. Moreover, the recording and/or reproducing apertures 30, 31 are sized to be larger in size than the recording and/or reproducing apertures 13, 14 provided in the first disc cartridge 5 described above. For positively opening the large-sized recording and/or reproducing apertures 30, 31, one of the shutter supporting portions 43 of the shutter member 42 is formed with a cut-out 45 adapted for opening the front sides of the openings 30, 31 of the main cartridge body unit 28 when the shutter member 42 is moved to the position of opening the apertures 30, 31. That is, the cut-out 45 is formed in the portions of the main cartridge body unit 28 extending on the upper and lower surfaces of the main cartridge body unit 28.

The shutter member 42, constructed as described above, is fitted from the front side of the main cartridge body unit 28 so that the shutter portions 43a, 43b will be extended over the recording and/or reproducing apertures 30, 31, such that the shutter member will be movable in the direction indicated by arrows a1 and a2 in FIGS. 4 and 5 in which the shutter portions 43a, 43b open and/or close the apertures 30, 31.

The shutter member 42 is biased by a spring member, not shown, provided in the main cartridge body unit 28, in the direction indicated by arrow a2 in FIGS. 4 and 5 in which the shutter portions 43a, 43b will close the recording and/or reproducing apertures 30, 31.

The disc drive device 100 for recording and/or reproducing information signals, selectively using one of the first disc cartridge 5 housing therein a first magnetic disc 6 adapted for recording and/or reproduction of information signals at the first recording density or a second disc cartridge 22 housing therein a second magnetic disc 23 adapted for recording and/or reproduction of information signals at a second recording density higher than the first recording density, is hereinafter explained by referring to the drawings.

Figure 6:
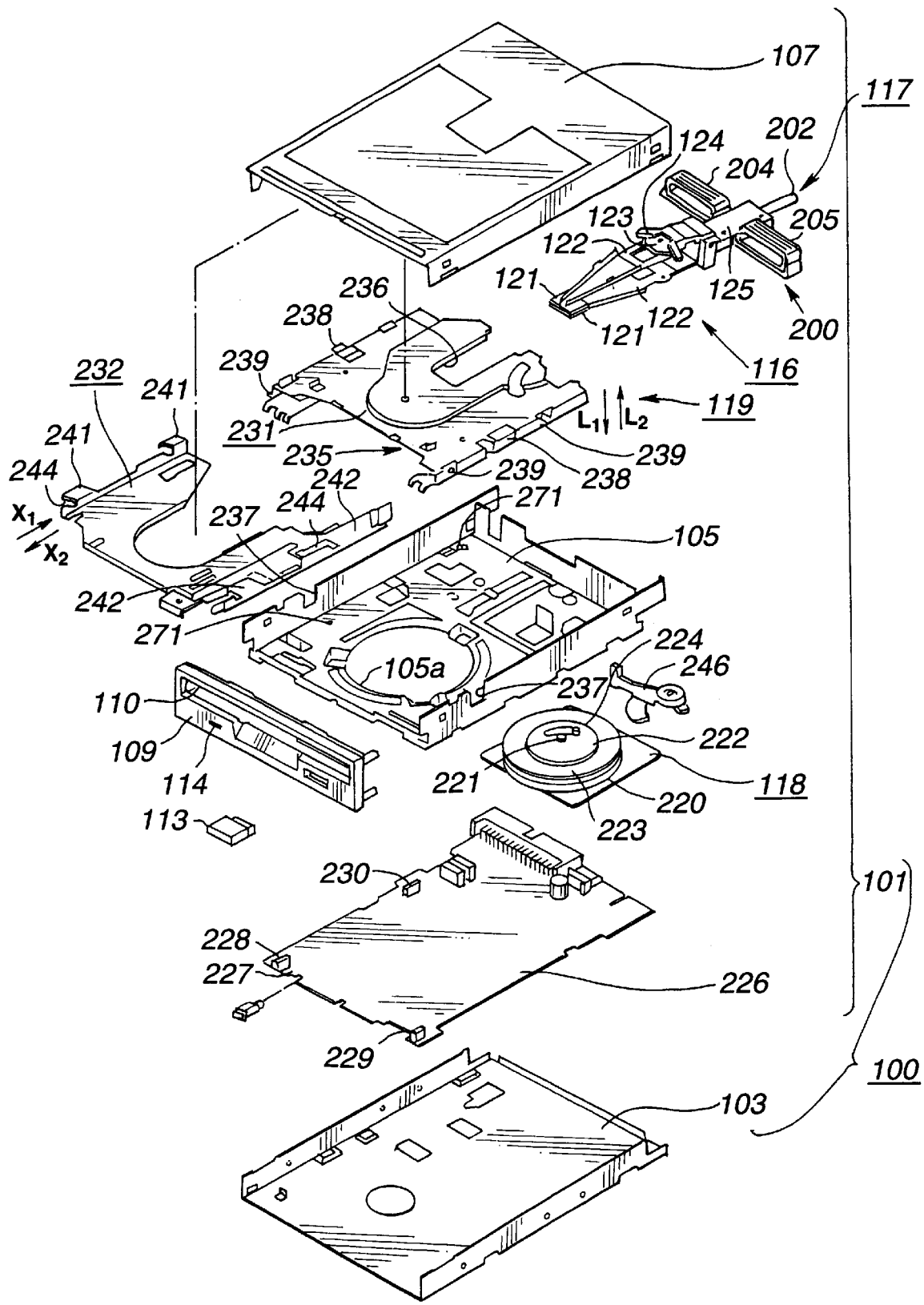
FIG. 6 is an exploded perspective view showing the disc drive device.

The disc drive device 100 according to the present invention includes a main body unit 101, on which is loaded the disc cartridge, and a mounting base block 103, operating as a lower cover for protecting the bottom surface of the main body unit 101, and which serves for mounting the main body unit 101 on a mating mounting portion within a casing of, for example, a computer, as shown in FIGS. 1 and 6.

The main body unit 101 includes a base member 105, formed by a sheet of metal or aluminum diecast, an upper cover 107 for protecting the inner portion of the base member 105 and a front panel 109 having a cartridge insertion removal opening 110 for inserting and removing the first or second disc cartridge 5 or 22 with respect to the main cartridge body unit 101, as shown in FIGS. 1 and 6.

The upper cover 107 is formed by bending a metal sheet to a substantially U-shaped cross-section, and is mounted on an upper end of the base member 105, as shown in FIGS. 1 and 6.

The front panel 109 is formed of, for example, synthetic resin, and is removably mounted on the base member 105.

The front panel 109 has, on its upper edge, a cartridge insertion removal opening 110 large enough in size to permit the first or second disc cartridge 5 or 22 to be inserted horizontally into the inside of the device with the front end carrying the shutter member 19 or 42 as an inserting end. This cartridge insertion removal opening 110 is closed by an opening and/or closure door 112 that is rotated towards the inside of the main body unit 101 in the non-loaded state of the first or second disc cartridge 5 or 22 in inside of the main body unit 101.

On both sides of the lower edge of the front panel 109, there are provided an ejection button 113 for actuating an ejection unit, not shown, for ejecting the first or second disc cartridge 5 or 22 loaded in the main body unit 101 therefrom and a light emitting display unit 114 for displaying the operating state of the disc drive device 100.

Referring to FIG. 6, the main body unit 101 of the disc drive device 100 includes a head mechanism 116 for recording and/or reproducing information signals for the first or second disc cartridge 5 or 22, a movement mechanism 117 for causing movement of the head mechanism 116 in the direction along the radius of the first or second magnetic disc 6 or 23, a disc rotating and driving mechanism 118 for rotationally driving the first or second magnetic disc 6 or 23, and a loading mechanism 119 for transferring the disc cartridge 5 or 22 to the cartridge loading position for recording or reproducing the first or second magnetic disc 6 or 23.

The head mechanism 116 is mounted for movement on the base member 105 within the main body unit 101 in the direction along the radius of the first or second magnetic disc 6 or 23, via the movement mechanism 117, to a position facing the first or second disc cartridge 5 or 22 loaded within the main body unit 101.

Referring to FIG. 6, this head mechanism 116 includes head units 121, 121 for recording and/or reproducing information signals with mutually different first and second recording densities, supporting arms 122, 122 carrying the head units 121, 121 at distal ends thereof, base plates 123, 123 arranged at the proximal ends of the supporting arms 122, 122, arm holding members 124, 124 holding the supporting arms 122, 122 via these base plates 123, 123 and a main head carriage member 125 carrying these arm holding members 124, 124.

The head units 121, 121 are arranged facing each other with the major surface of the first or second magnetic disc 6 or 23 in-between, a head slider, not shown, having first and second magnetic head elements for recording and/or reproducing information signals with the mutually different first and second recording densities, a gimbal spring for pivotally supporting the head slider and a spacer carrying this gimbal spring.

The head slider includes a first magnetic head element for recording and/or reproducing information signals with the first recording density, a second magnetic head element for recording and/or reproducing information signals with a second recording density higher than the first recording density, and a magnetic circuit constituted by a coil and a magnetic core forming member. The gimbal spring is constituted by a thin metal sheet and carries an elastically deformable head supporting portion at a mid portion thereof. By mounting the head slider on the head support, the gimbal spring pivotably supports the head slider via a head support. The spacer is formed to a substantially rectangular tubular shape, having an inner pivot compressing against the head supporting portion of the gimbal spring, and has at its one end a mounting portion for the outer rim of the gimbal spring. The other end of the spacer is mounted on the distal end of the supporting arm 122.

The supporting arm 122 is formed by a thin metal sheet and is tapered such that its width is progressively decreased towards its distal end. On a surface of the distal end of the supporting arm 122 facing the signal recording surface of the first or second magnetic disc 6 or 23, there are mounted head units 121, 121. The base plate 123 is formed of a metallic material, and is bonded to the proximal end of the supporting arm 122, while being mounted on an arm holding member 124. The arm holding member 124 is formed of a tough material and includes a guide piece for guiding the movement of the head units 121, 121 by slidingly contacting with the upper surface of the cartridge holder of the loading mechanism 119. The main head carriage member 125, formed of a tough material, is formed to a U-shaped cross-section, and is supported for movement by the movement mechanism 117.

The head mechanism 116, having head units 121, 121 as described above, is able to record and/or reproduce information signals for the first magnetic disc 6, on which information signals are recorded at a first recording density, and the second magnetic disc 23, on which information signals are recorded at the second recording density higher than the first recording density.

In recording and/or reproducing information signals for the first magnetic disc 6, the first magnetic disc 6 is run in rotation in a state in which the first magnetic head elements of the head units 121, 121 mounted on the distal ends of the supporting arms 122, 122 are slidingly contacted with the signal recording surface of the first magnetic disc 6. At this time, the first magnetic disc 6 is run in rotation at a rpm of approximately 300 by the disc rotating driving unit 118 to record and/or reproduce the information signals by the first magnetic head elements.

In recording and/or reproducing information signals for the second magnetic disc 23, the second magnetic head elements of the head units 121, 121 are slightly floated from the signal recording surface of the second magnetic disc 23. That is, on detection of the loading of the second magnetic disc 23, the disc rotating driving unit 118 rotationally drives the second magnetic disc 23 at an rpm of approximately 3600. If the second magnetic disc 23 is run in rotation at a high speed, there is induced air convection between the head slider surface facing the signal recording surface of the second magnetic disc 23 and the signal recording surface of the second magnetic disc 23 to produce a so-called air film. By the operation of this air film, the head units 121, 121 are floated a fixed distance, such as approximately 50 nm, from the signal recording surface of the second magnetic disc 23. With the second magnetic disc 23 floated in this manner from the signal recording surface of the second magnetic disc 23, information signals are recorded or reproduced by the second magnetic head element.

Referring to FIG. 6, the movement mechanism 117 includes a main guide shaft 202 and a follower guide shaft, arranged on the base member 105 for movably supporting the main head carriage member 125 of the head mechanism 116, and an electromagnetic driving unit 200 for causing movement of the head units 121, 121 of the head mechanism 116 via the main head carriage member 125 in a direction along the radius of the first or second magnetic disc 6,23. An electromagnetic deriving unit 200 includes driving coils 204, 205, inserted into the yoke of a voice coil motor, not shown. As the driving current is fed to the driving coils 204, 205, the movement mechanism 117 is moved in the direction along the radius of the first or second magnetic disc 6 or 23 loaded on a disc table 222.

Referring to FIG. 6, the disc rotating and driving mechanism 118 includes a spindle motor 220, mounted on the base member 105, and a disc table 222 mounted on the distal end of the spindle motor 220 for rotation in unison with a spindle 221. On a setting surface of the disc table 222, on which the first magnetic disc 6 or the second magnetic disc 23 is set, there is mounted a magnet 223 for sucking the hub 8 or 25 mounted on the magnetic disc 6 or 23. On the setting surface of the magnetic disc 6 or 23, there is protuberantly formed a driving pin 224 engaged with or inserted into the driving pin engagement hole 8b in the hub 8 or the driving pin engagement hole 25b in the hub 25. The driving pin engagement hole 8b or the driving pin engagement hole 25b is provided at an offset position with respect to the spindle 221 in the hub 8 or 25, respectively. The driving pin 224 is biased by a biasing member, such as a tension spring, not shown, towards the outer rim of the disc table 222 towards the outer rim of the disc table 222.

On the lower surface of the base member 105, there is mounted an electronic circuit board 226 carrying a variety of electronic circuits or detection switches. On this electronic circuit board 226, there is mounted a disc-in detection switch 227 for detecting the possible presence of the loaded first or second disc cartridge 5, 22, so that a knob thereof to be thrust is protruded on the upper surface side of the base member 105, as shown in FIG. 6. On the electronic circuit board 226, there are mounted a first or second mistaken recording inhibiting detection switch 228 or 229 for detecting the opening state of the mistaken recording inhibiting hole 16 or 32 provided in the first or second disc cartridge 5 or 22, respectively. On the electronic circuit board 226, there is also provided a disc mistaken recording inhibition detection switch 230 for detecting the disc discriminating hole 34 provided in the second disc cartridge 22, as shown in FIG. 6. This disc mistaken recording inhibition detection switch 230 detects the possible presence of the disc capacity discrimination hole in the disc cartridge, loaded in position on the disc drive device, to detect the capacity of the magnetic disc housed in the disc cartridge.

Referring to FIG. 6, the loading mechanism 119 includes a cartridge holder 231 for holding the first disc cartridge 5 or the second disc cartridge 22 loaded via the cartridge insertion and/or removal opening 110, and a lift plate 232 for lifting or lowering the cartridge holder 231 between a cartridge inserting or removing position in which the first disc cartridge 5 or the second disc cartridge 22 is inserted into or removed from the cartridge holder 231 and a cartridge loading position in which the cartridge holder 231 is set on the disc table 222 of the disc rotating and driving mechanism 118.

The cartridge holder 231 includes a cartridge holder 235 on each side for holding both sides along the width of the first disc cartridge 5 or the second disc cartridge 22 inserted into the main cartridge body unit 101. The cartridge holder 231 is substantially in the form of a casing having an opened forward side facing the cartridge insertion and/or removal opening 110 and a opened lower side facing the base member 105. On both sides of the cartridge holder 231, there are outwardly segmented guide pieces 238, 238 engaged in guide grooves 237 formed in the lateral sides of the base member 105. It is by these guide pieces 238, 238 that the cartridge holder 231 is guided in its upward or downward movement relative to the base member 105. On both lateral sides of the cartridge holder 231 are protuberantly formed outwardly directed supporting shafts 239 supported for movement on the lift plate 232.

The cartridge holder 231, holding the first disc cartridge 5 or the second disc cartridge 22, inserted via the cartridge insertion removal hole 110 into the inside of the main body unit 101, is moved in the up-and-down direction (in the direction indicated by arrows L1 and L2) between the cartridge inserting and removing position spaced apart from the disc table 222 of the disc rotating and driving mechanism 118 and the cartridge loading position close to the disc table 222, by the lift plate 232 assembled to the base member 105. The cartridge holder 232 operates for loading the first magnetic disc 6 or the second magnetic disc 23 housed in the first disc cartridge 5 or in the second disc cartridge 22 on the disc table 222 or unloads the magnetic disc 6 or 23 loaded on the disc table 222.

On the upper surface of the base member 105, there is arranged the lift plate 232 between the base member 105 and the cartridge holder 231 for uplifting and lowering the cartridge holder 231 towards and away from the disc rotating and driving mechanism 118 provided on the base member 105. On both opposite sides of the lift plate 232 are formed upstanding cam pieces 241, 242 having upwardly inclined cam grooves 244, as shown in FIG. 6. In these inclined grooves 244 of the cam pieces 241, 242 are movably engaged supporting shafts 239 protuberantly formed on both sides of the cartridge holder 231.

Figure 9:
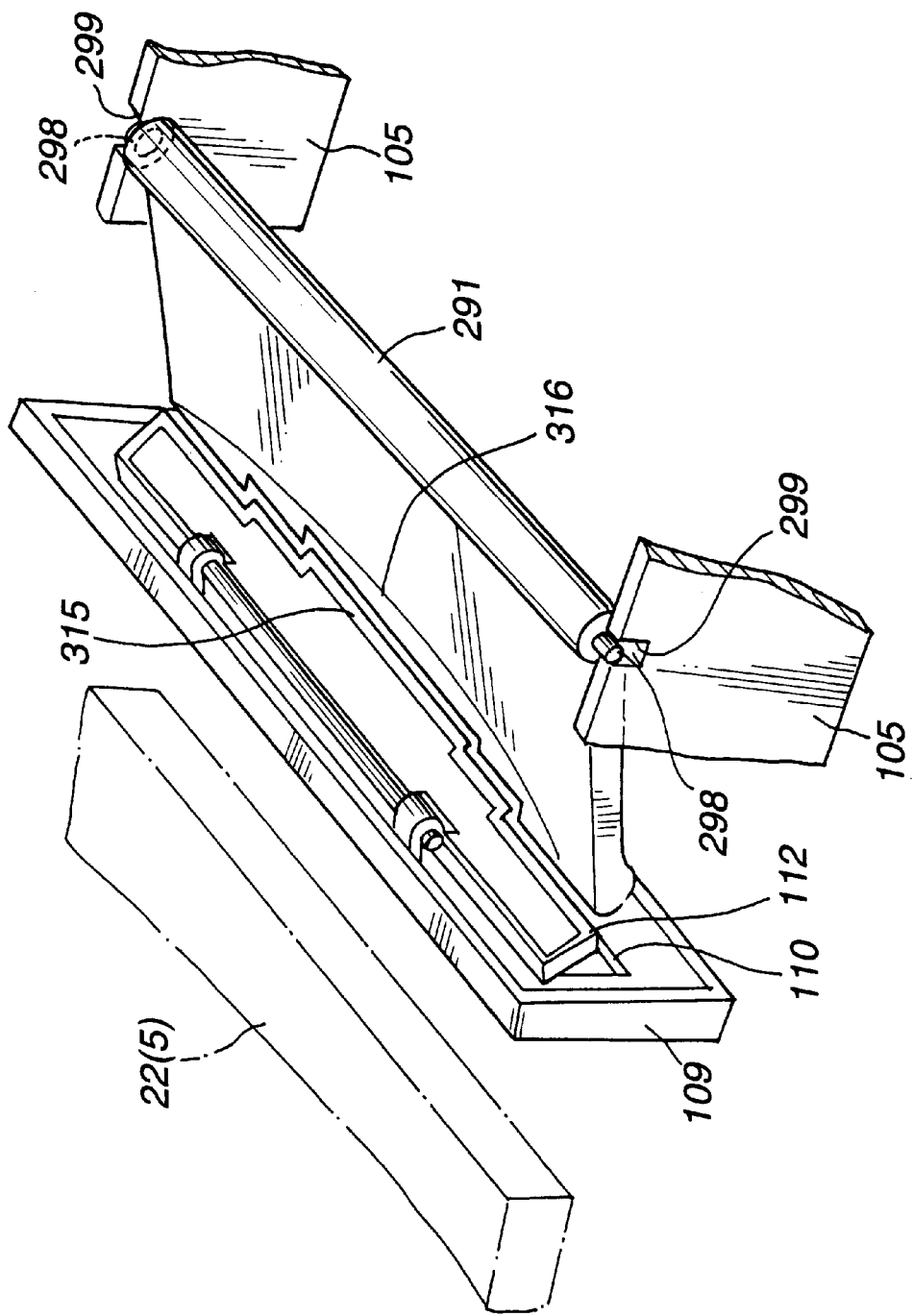
FIG. 9 is a perspective view for illustrating the dust-proofing panel.

The lift plate 232 is biased into movement in the direction indicated by arrow X2 in FIG. 9 by a biasing member, not shown. On the rear side of the base member 105, there is rotatably mounted a lock lever 246 for locking the lift plate 232 in the rearwardly moved position.

On the rear side of the base member 105, there is mounted an ejection motor for causing movement of the lift plate 232 in the direction indicated by arrow X1 in FIG. 6, against the biasing force by a biasing member, not shown.

When the first disc cartridge 5 or the second disc cartridge 22 can be inserted into or removed from the main body unit 101 of the device via the cartridge insertion and/or removal opening 110, the lift plate 232 is moved by the ejection motor in the direction indicated by arrow X1 in FIG. 6 to a position rearwardly of the base member 105. At this time, the lift plate 232 is locked by the lock lever 246 and kept at a position rearwardly of the base member 105. When the lift plate 232 is locked by the lock lever 246, the cartridge holder 231 has its supporting shafts 239 supported by the upper ends of the cam pieces 241, 242 above the inclined grooves 244, so that the cartridge holder 232 is held at the raised position spaced from the disc table 222 of the disc rotating and driving mechanism 118. When held at its uplifted position, the cartridge holder 231 is positioned with the opening end on its front side facing the cartridge insertion and/or removal opening 110. If the first disc cartridge 5 or the second disc cartridge 22 is inserted into the inside of the cartridge holder 231 via the cartridge insertion and/or removal opening 110, the lock lever 246 is rotated by being thrust from the inserting side of the first disc cartridge 5 or the second disc cartridge 22. When the first disc cartridge 5 or the second disc cartridge 22 is inserted up to the pre-set inserting position within the cartridge holder 231, the lock lever 246 is rotated to unlock the lift plate 232. When released from the locking by the lock lever 246, the lift plate 232 is moved in the direction indicated by arrow X2 in FIG. 6, under the force of bias of the biasing member. If the lit plate 232 is moved in the direction indicated by arrow X2 in FIG. 6, the supporting shafts 239 are moved to the lower sides along the inclined grooves 244 of the cam pieces 241, 242 to lower the cartridge holder 231 towards the disc table 222 towards the base member 105 in the direction indicated by arrow L1 in FIG. 6. The lift plate 232 lowers the cartridge holder 231 to load the first disc cartridge 5 or the second disc cartridge 22 held on the cartridge holder 231 in the loading position on the base member 105 as well as to load the first magnetic disc 6 or the second magnetic disc 23 housed in the first disc cartridge 5 or in the second magnetic disc 23 on the disc table 222.

At this time, the spindle 221 is inserted into the spindle hole 8a or 25a provided in the hub 8 or 25, respectively, the driving pin 224 is engaged with or inserted into the driving pin engagement hole 8b or the driving pin engagement hole 25b and the hub 8 or 25 is sucked by the magnet, so that the first magnetic disc 6 or the second magnetic disc 23 is set on the disc table 222 and can be run in rotation in unison with the disc table 222. As the spindle motor 220 is run in operation, the first magnetic disc 6 or the second magnetic disc 23 is rotated in unison with the disc table 222 at an rpm corresponding to the relevant recording density.

When the first disc cartridge 5 or the second disc cartridge 22 is ejected from the cartridge loading position, the ejection motor is run in rotation on thrusting the election button 113, so that the lift plate 232 of the loading mechanism 119 is moved in the direction indicated by arrow X1 in FIG. 6. As the lift plate 232 is moved in the direction indicated by arrow X2 in FIG. 6, the cartridge holder 231 is moved to the cartridge inserting and removing position, at the same time as the lock lever 246 is rotated to eject the first disc cartridge 5 or the second disc cartridge 22 via the cartridge insertion and/or removal opening 110.

Figure 7:
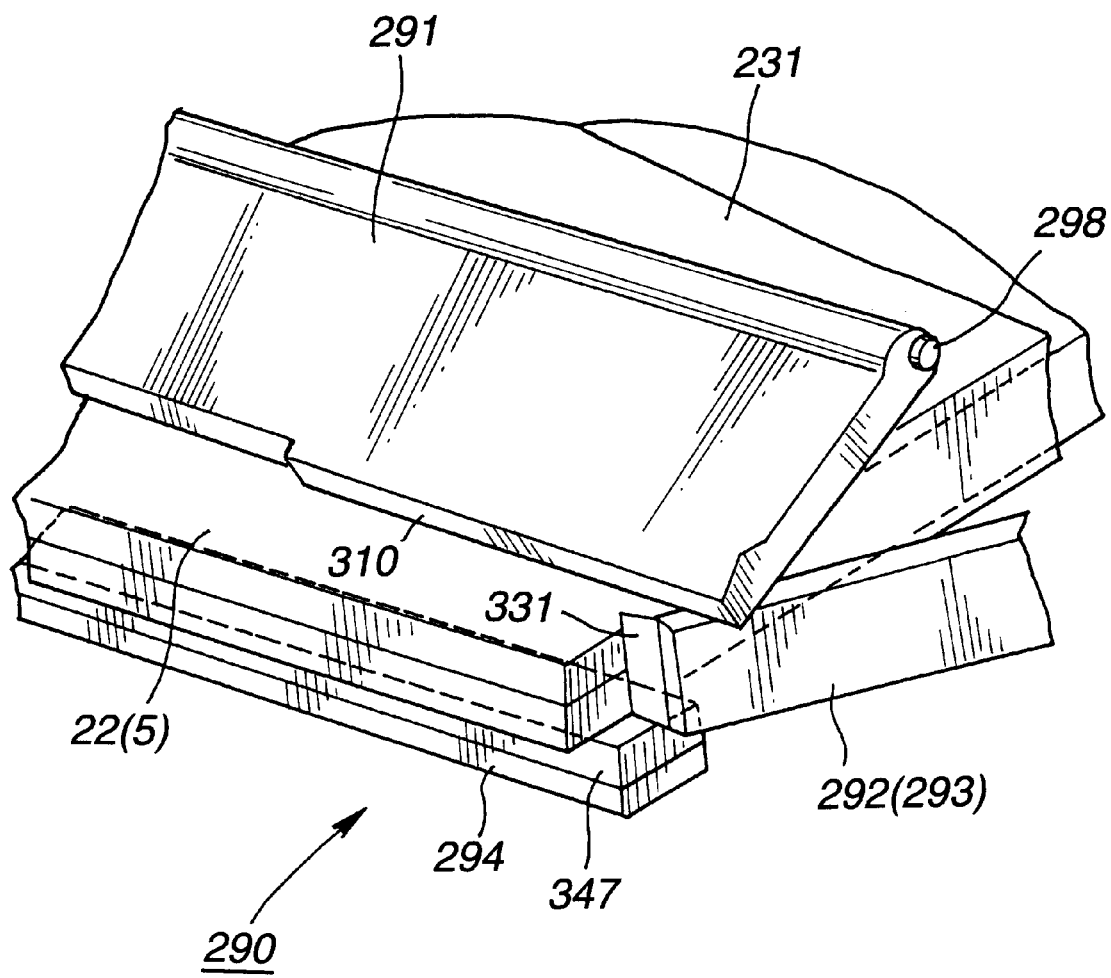
FIG. 7 is a perspective view showing a dust-proofing mechanism provided in the disc drive device.

The disc drive device 100 of the present invention includes a dust-proofing mechanism 290, arranged adjacent to the cartridge insertion and/or removal opening 110, via which the first disc cartridge 5 or the second disc cartridge 22 is inserted or removed, to prevent dust and dirt from being introduced into the inside of the main body unit 101 of the device, as shown in FIG. 7.

The dust-proofing mechanism 290 includes a dust-proofing panel 291 for the major surface, abutted on the major surface of the first disc cartridge 5 or the second disc cartridge 22, a set of dust-proofing arms 292,293 for lateral sides, abutted against the lateral sides of the first disc cartridge 5 or the second disc cartridge 22 and a dust-proofing plate 294 for bottom surface, abutted against the bottom surface of the first disc cartridge 5 or the second disc cartridge 22, as shown in FIG. 7.

Figure 8:
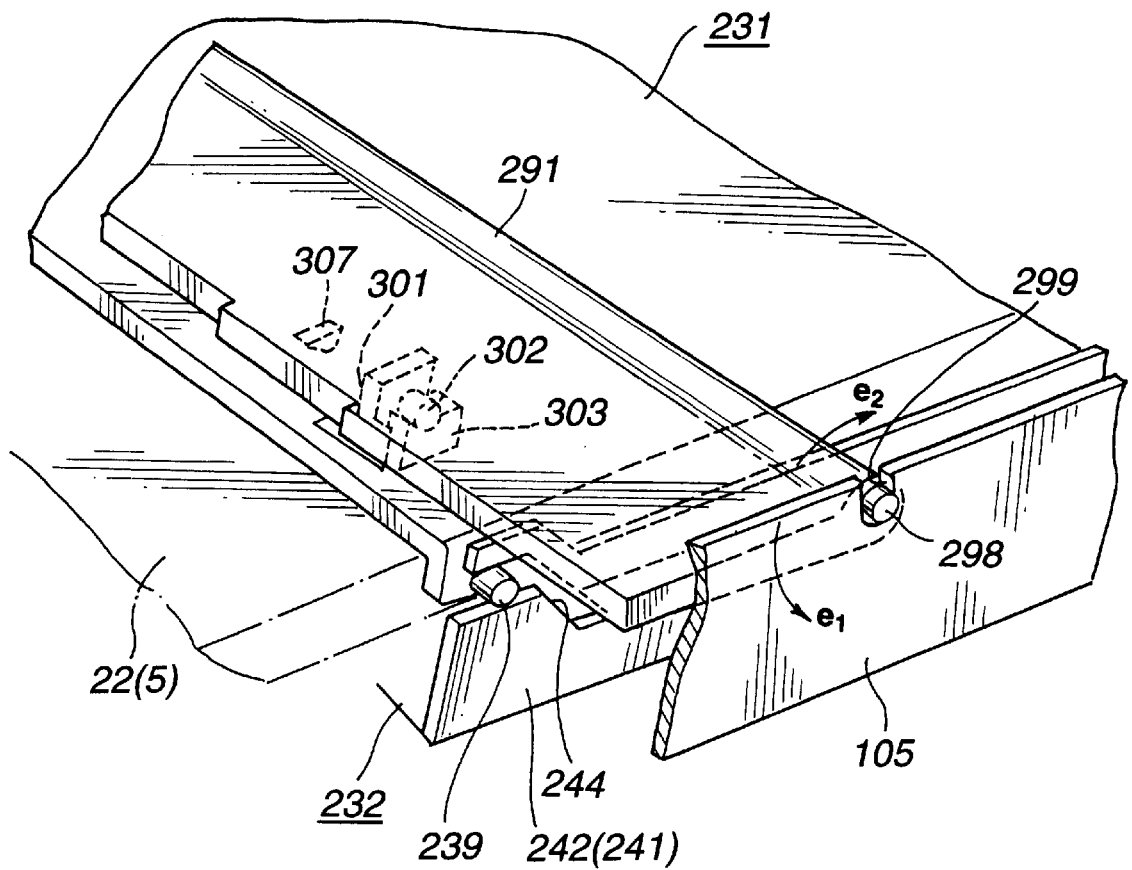
FIG. 8 is a perspective view showing a dust-proofing panel provided in the dust-proofing mechanism.

The dust-proofing panel 291 of the dust-proofing mechanism 290 is in the form of a substantially rectangular plate of, for example, a synthetic resin material, and has a width parallel to the longitudinal side slightly larger than the width of the first disc cartridge 5 or the second disc cartridge 22, as shown in FIGS. 8 and 9.

Figure 10:
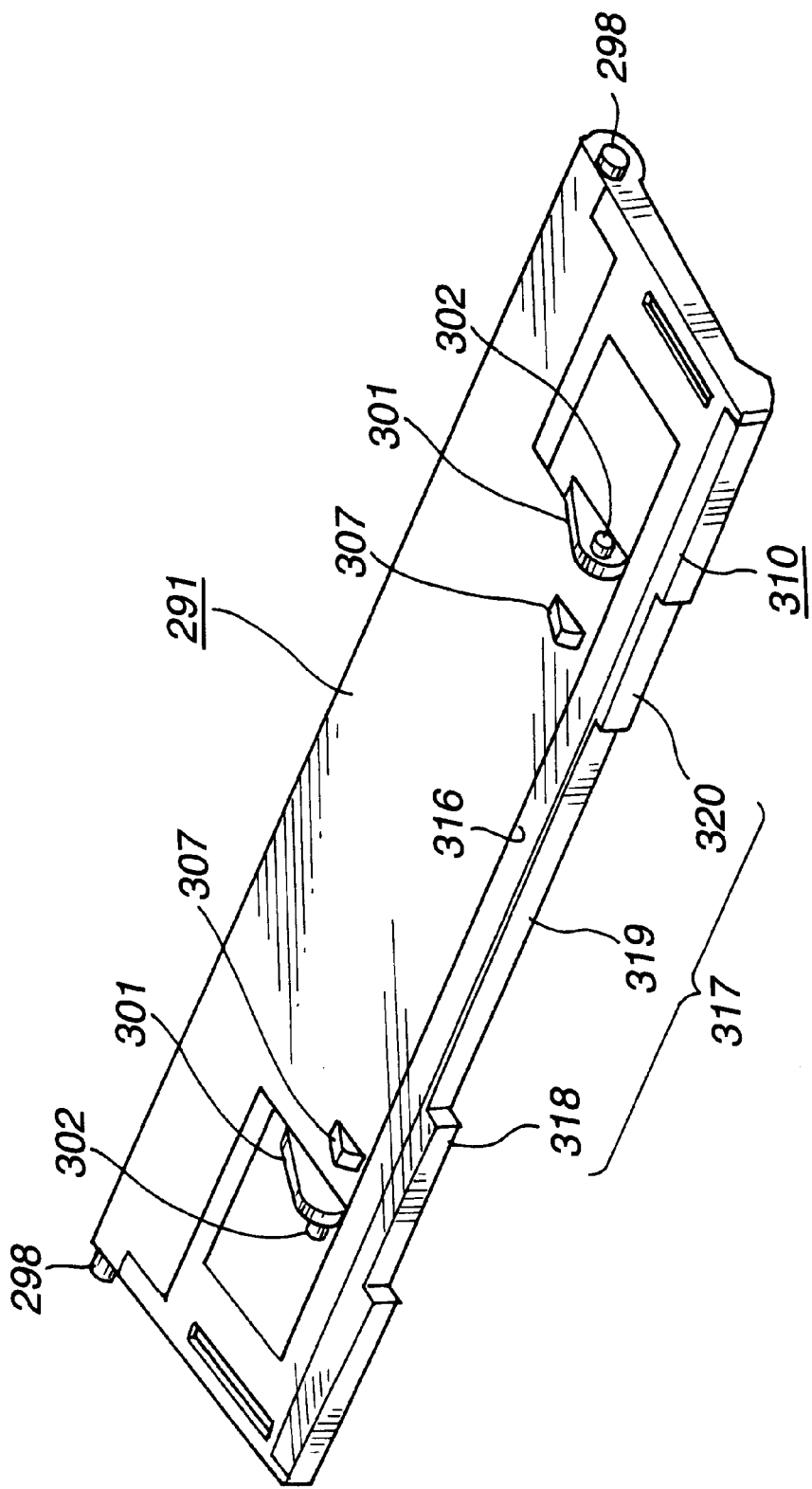
FIG. 10 is a perspective view of the dust-proofing panel, as seen from its bottom side.

On both ends along the width of the dust-proofing panel 291, rotary pivot shafts 298, 298 rotatably supported on the base member 105 in the direction indicated by arrows e1 and e2 in FIG. 8, are protuberantly formed as one with the dust-proofing panel 291, as shown in FIGS. 8 and 10. On the base member 105, bearing grooves 299, 299 for rotatably supporting the rotary pivot shafts 298, 298 of the dust-proofing panel 291 are cut in the upper ends of both lateral sides of the base member 105, as shown in FIG. 8.

The dust-proofing panel 291 is formed as one with connecting pieces 301, 301 on its surface facing the major surface of the first or second disc cartridge 5 or 22, as shown in FIGS. 8 and 10. The connecting pieces 301, 301 are adapted to be connected to the cartridge holder 231. The connecting pieces 301, 301 are formed as one with pivot shafts 302, which are rotatably engaged by the cartridge holder 231, for extending towards both ends in the longitudinal direction of the dust-proofing panel 291, in parallel with the longitudinal direction.

Figure 11:
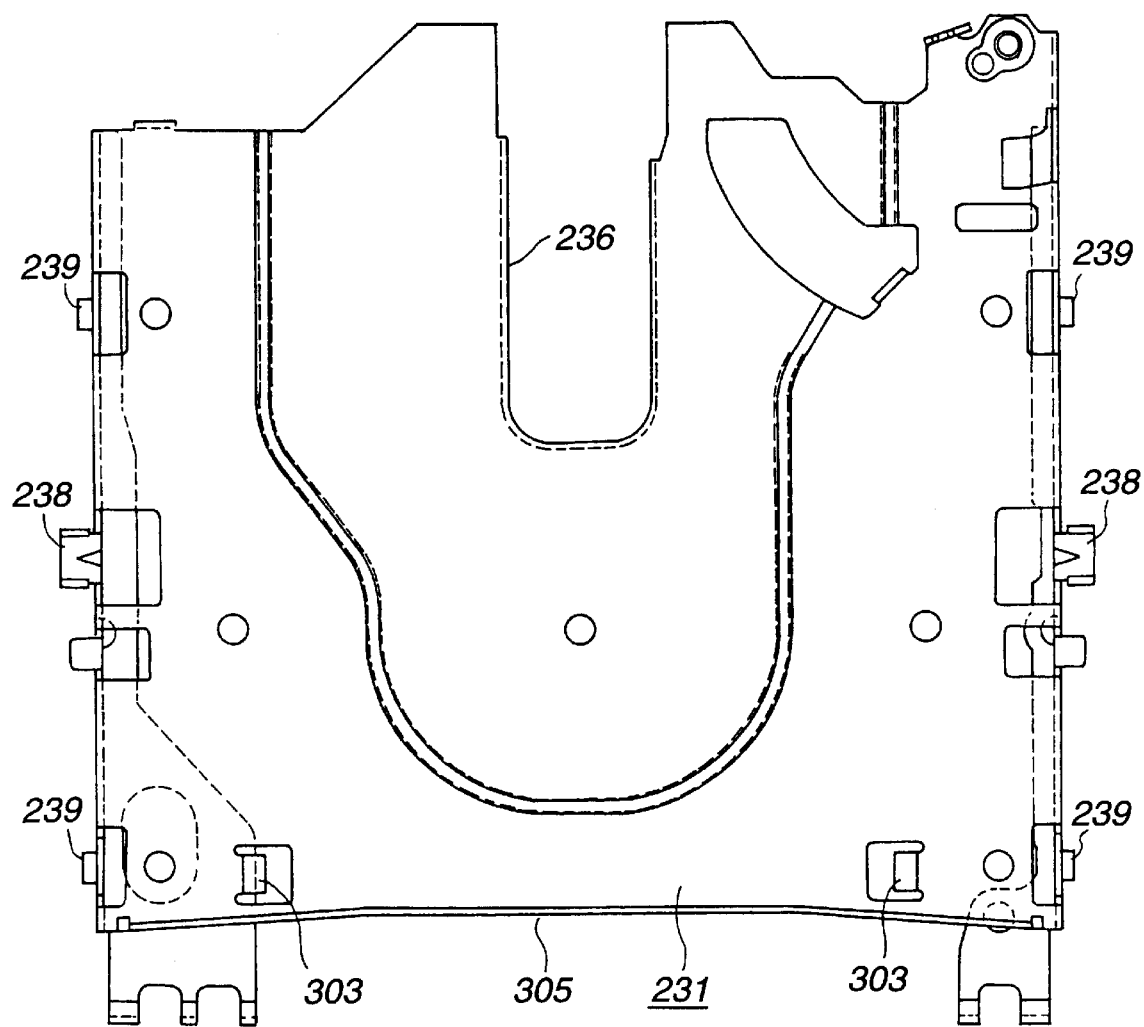
FIG. 11 is a plan view showing essential parts of a cartridge holder connected to the dust-proofing panel.

The cartridge holder 231 is formed with engagement pieces 303, 303 by segmenting portions of its upper surface facing the major surface of the loaded first or second disc cartridge 5 or 22, as shown in FIGS. 8 and 11. These engagement pieces 303,303 are warped in the L-shaped cross-section, towards both sides of the cartridge holder 231, and are engaged at the distal ends thereof by the connecting shafts 302, 302 of the dust-proofing panel 291. Thus, the dust-proofing panel 291 is run in rotation, via the connecting shafts 302,302, in association with the lifting and lowering operation of the cartridge holder 231.

In the upper surface of the cartridge holder 231, there is formed a substantially arcuate cut-out 305 at an inserting side end into which is inserted the first or second disc cartridge 5 or 22, in order to prevent the opening and/or closure door 112, adapted for opening and/or closing the cartridge insertion and/or removal opening 110, from colliding against the cartridge holder 231 when the opening and/or closure door 112 is rotated.

On the surface of the dust-proofing panel 291 facing the first or second disc cartridge 5 or 22, there are formed abutment pieces 307, 307 adapted for compressing against the upper surface of the first or second disc cartridge 5 or 22, as shown in FIGS. 8 and 10.

By the abutment pieces 307, 307 compressing against the upper surface of the cartridge holder 231, the dust-proofing panel 291 is prevented from being detached towards the cartridge holder 231 when the first disc cartridge 5 or the second disc cartridge 22 is not loaded in the cartridge holder 231.

The dust-proofing panel 291 is provided with a dust-proofing member 310 extending along its lateral side which is contacted on rotation with and separated away from the major surface of the first or second disc cartridge 5 or 22, as shown in FIG. 10. The dust-proofing member 310 is elastically deformable to conform to the shape of the major surface of the main cartridge body unit 11 or 28. The dust-proofing member 310 is formed of an elastic material that can be elastically deformed to suit to the shape of the main cartridge body unit 11 or 28, such as, for example, sponge or non-woven fabric.

Meanwhile, in the cartridge insertion and/or removal opening 110 of the front panel 109, there is formed a collision-preventative cut-out 312 for preventing the collision of the hub 8 or 25 provided on the first or second magnetic disc 6 or 23 in the first or second disc cartridge 5 or 22 at the time of insertion or removal. In the cartridge insertion and/or removal opening 110, there is also formed a recess 313 for facilitating the insertion of the first or second disc cartridge 5 or 22 in the cartridge insertion and/or removal opening 110 by permitting the user's finger to face the vicinity of the opening 110, in order to improve the ease in insertion. To this end, the cartridge insertion and/or removal opening 110 is provided with a stepped protrusion 315 extending from both longitudinal ends of the lower end towards the center, in agreement with the collision-preventative cut-out 312 and the recess 313, as shown in FIG. 9.

The lower end of the opening and/or closure door 112 is protruded towards the inner side of the main body unit 101 of the device, in the state in which the first or second disc cartridge 5 or 22 is not inserted, as shown in FIG. 9. Since the lower end of the opening and/or closure door 112 compresses against the major surface of the inserted first or second disc cartridge 5 or 22, it is rotated in a region close to the dust-proofing panel 291.

The dust-proofing panel 291 is provided with an arcuate cut-out 316 in order to prevent collision of its lower end against the lower end of the opening and/or closure door 112, which are drawn close to each other on rotation of the dust-proofing panel 291, as shown in FIGS. 9 and 10. The dust-proofing member 310 is provided for extending along the cut-out 319. A stepped cut-out 317 is constituted by stepped cut-outs 318, 319, 320 to suit to the shape of the protrusion 315 at the lower end of the opening and/or closure door 112, as shown in FIG. 10.

Thus, a desired gap is maintained between the dust-proofing member 310 of the dust-proofing panel 291 and the lower end of the opening and/or closure door 112 when these members are moved to close to each other, thus positively preventing the lower ends from colliding against each other.

In the dust-proofing panel 291, constructed as described above, the operation of the dust-proofing panel 291 abutting against the major surface of the main cartridge body unit 11 or 28 when the first or second disc cartridge 5 or 22 is loaded in position, is explained with reference to the drawings.

Figure 12:
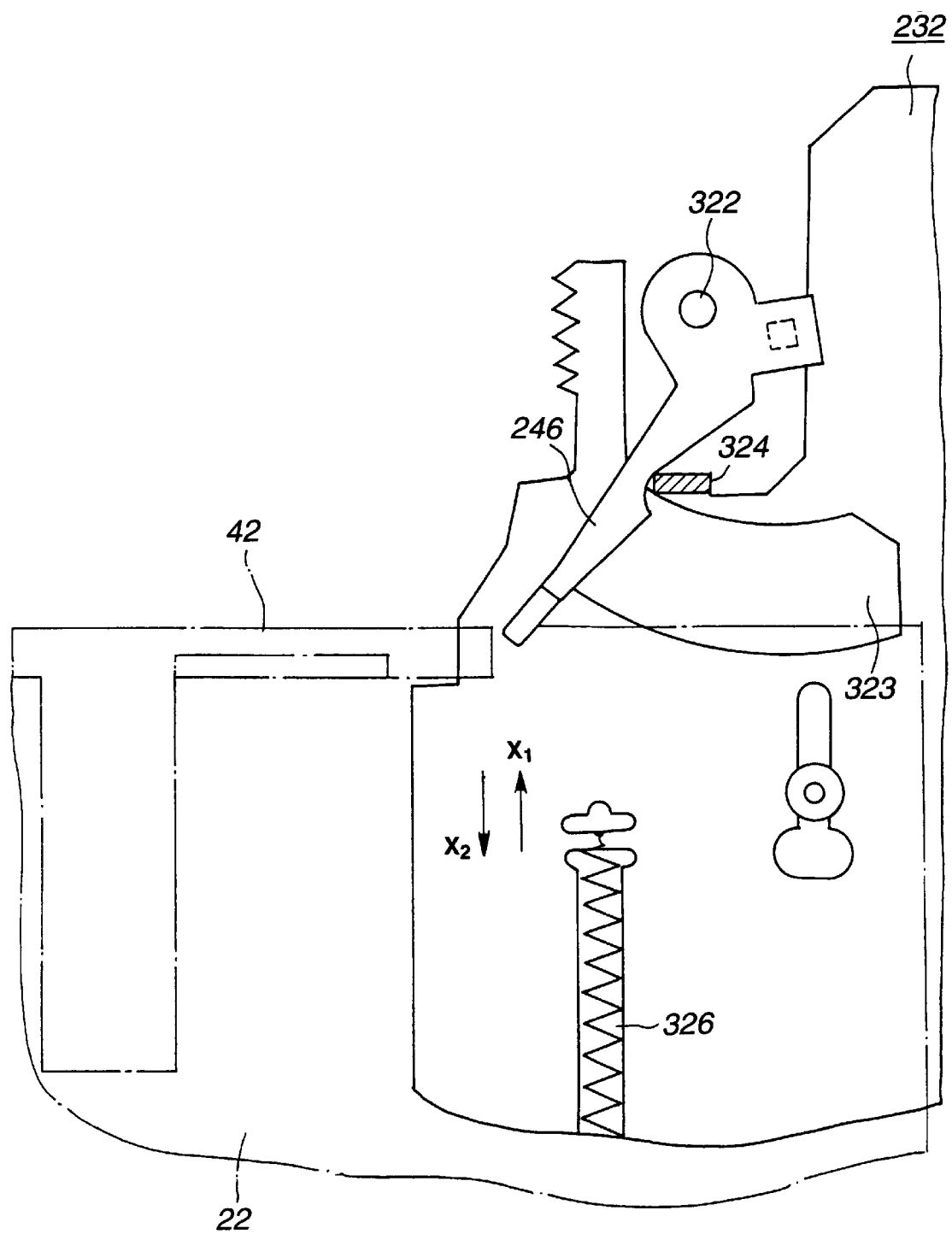
FIG. 12 is a plan view showing the state of engagement between a lift plate and a lock lever provided in the disc drive device.

First, referring to FIG. 12, the first or second disc cartridge 5 or 22, inserted into the inside of the cartridge holder 231, is abutted against one end of the lock lever 246 which locks the cartridge 231 at a position in register with the cartridge insertion and/or removal opening 110. The lock lever 246 is rotationally supported via a rotary pivot shaft 322 set upright on the base member 105, so that the lock lever 246 locks the position of the lift plate 232 by a lock piece 323 engaging with an engagement pawl 324 formed on the lift plate 232, as shown in FIG. 12.

Figure 13:
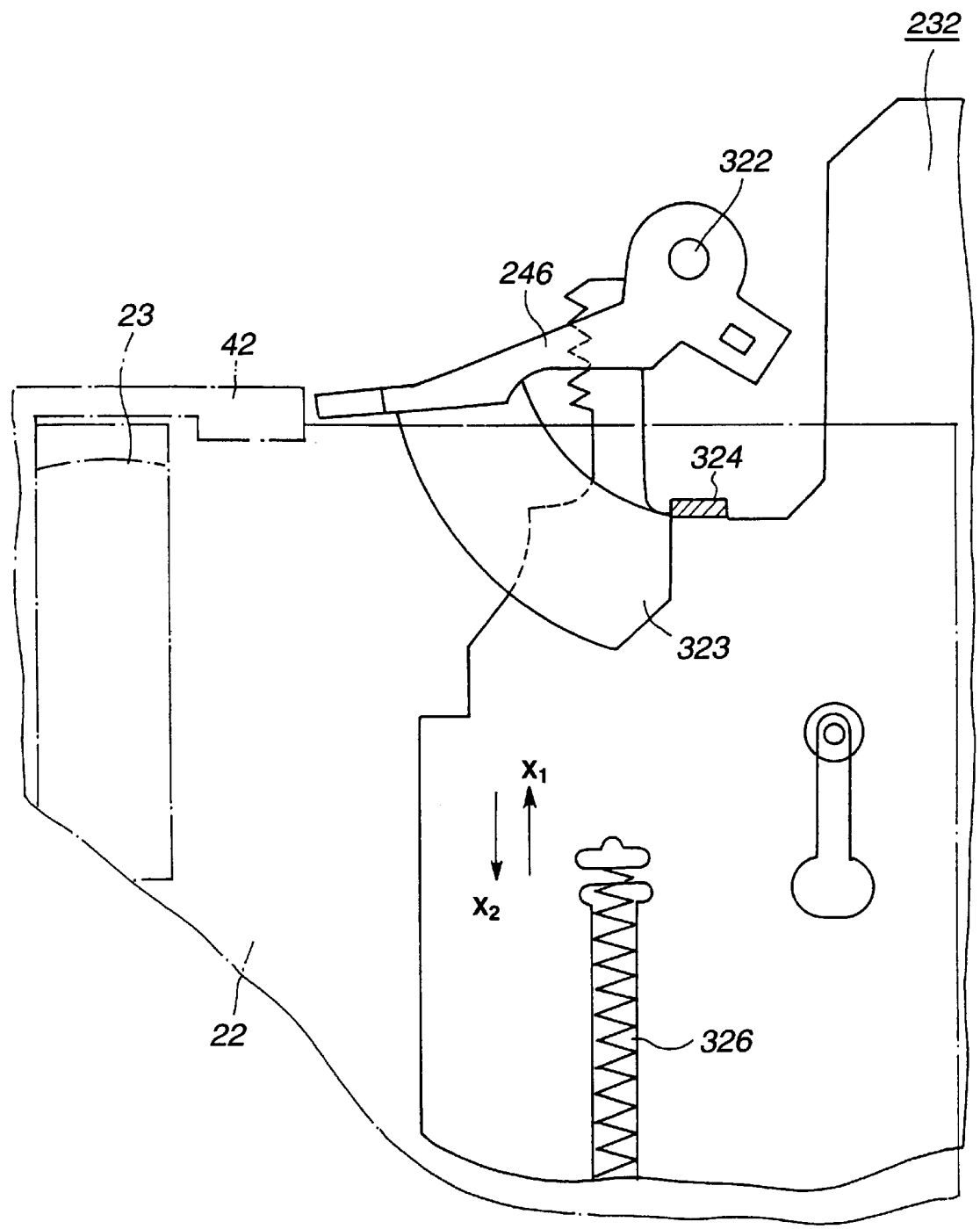
FIG. 13 is a plan view showing the disengaged state of the lift plate and the lock lever.

As the first or second disc cartridge 5 or 22 is intruded into the inside of the cartridge holder 231, it thrusts the end of the lock lever 246 to rotate it, as shown in FIGS. 12 and 13. When rotated, the lock lever 246 actuates the shutter member 19 or 42 of the first or second disc cartridge 5 or 22 in the opening direction, while disengaging the lock piece 323 from the engagement pawl 324 of the lift plate 232.

Figure 14:
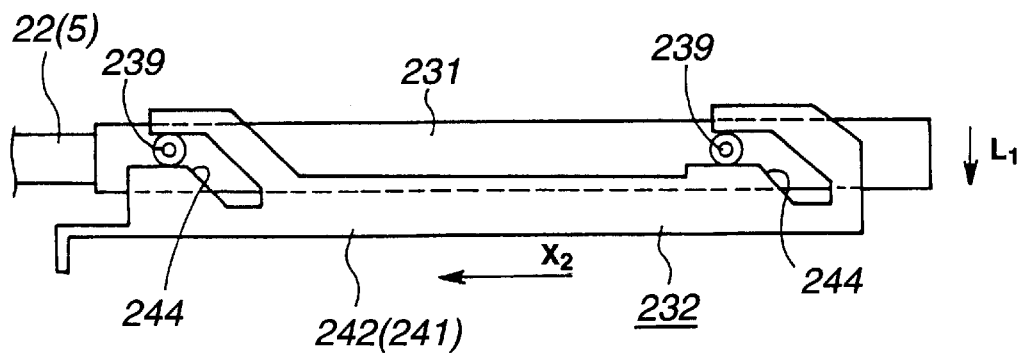
FIG. 14 is a side view for illustrating the operation of a cartridge holder and the lift plate provided in the disc drive device.

When unlocked from the lock lever 246, the lift plate 232 is slid in the direction indicated by arrow X2 in FIG. 13 under the bias of a compression coil spring 236. The lift plate 232 is moved in the direction indicated by arrow X2 in FIG. 13, as shown in FIG. 14, to cause movement of the cartridge holder 231 supported by the supporting shaft 239 in the inclined grooves 244 of the cam pieces 241,242 to lower the cartridge 231 in the direction indicated by arrow L1 in FIG. 14 to shift the cartridge holder 231 to the cartridge loading position.

Figure 15:
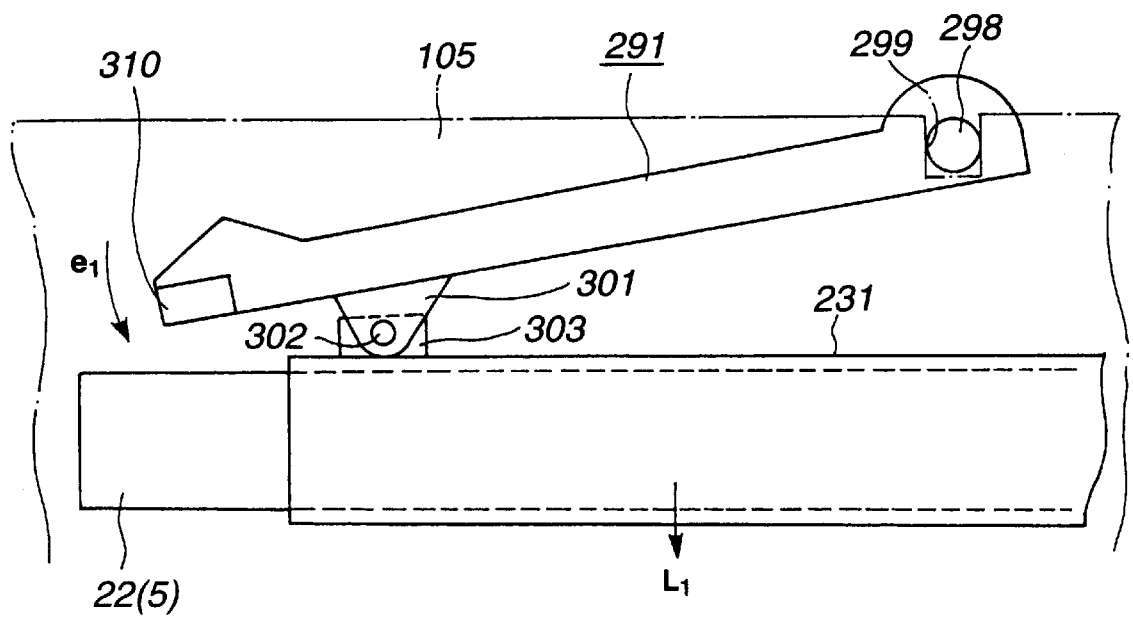
FIG. 15 is a side view for illustrating the operation of the dust-proofing panel.

As the cartridge holder 231 holding the first or second disc cartridge 5 or 22 is lowered in the direction indicated by arrow LI in FIG. 15, the connecting shafts 302, 302 of the dust-proofing panel 291 held in the engagement pieces are moved, so that the dust-proofing panel 291 is rotated in the direction indicated by arrow e1 in FIG. 15 about the rotational supporting shafts 298, 298 as the center of rotation.

Therefore, by the dust-proofing member 310 compressing against the major surface of the main cartridge body unit 11 or 28 of the first or second disc cartridge 5 or 22 protruded from the inside of the cartridge holder 231, the dust-proofing panel 291 suppresses dust and dirt from entering the inside of the main body unit of the device 101 from the major surface side of the main cartridge body unit 11 or 28.

The opening and/or closure door 112, opening or closing the cartridge insertion and/or removal opening 110, has its lower end compressed against the major surface of the main cartridge body unit 11 or 28, as the first or second disc cartridge 5 or 22 is set on the cartridge loading position. Thus, by arranging the dust-proofing member 310 so that the dust-proofing member 310 compresses against the lower end of the opening and/or closure door 112 along the width of the main cartridge body unit 11 or 28, dust-proofing properties can be improved further.

The set of dust-proofing arms 292, 293, provided in the dust-proofing mechanism 290, are arranged facing both lateral sides of the lift plate 232, and are rotated with movement of the lift plate 232, as shown in FIG. 7.

Figure 16:
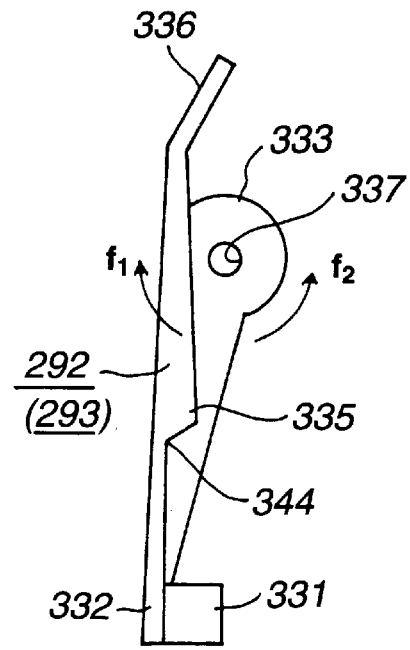
FIG. 16 is a plan view showing a dust-proofing arm provided in the dust-proofing mechanism.

The dust-proofing arms 292, 293 are formed of, for example, a synthetic resin material, and include a dust-proofing member 331, abutted against the lateral side of the first or second disc cartridge 5 or 22, a supporting piece 332, supporting the dust-proofing member 331 abutted at its distal end, and a mounting piece 333 formed as one with the lower end of the supporting piece 332 and which is rotationally mounted on the base member 105, as shown in FIG. 16.

The supporting piece 332 of the dust-proofing arms 292,293 is formed as one with a first actuating projection 335 and a second actuating projection 336, rotationally driven by the lift plate 232, as shown in FIG. 16.

The dust-proofing member 331 is formed of an elastic material, such as sponge, and is formed as a block one side of which is slightly larger in size than the thickness of the main controller body unit 11 or 28 of the first or second disc cartridge 5 or 22, as shown in FIG. 16. The supporting piece 332 is substantially in the form of a rectangular plate having its longitudinal side extending parallel to the direction of movement of the lift plate 232. On one longitudinal end of the supporting piece 332 is mounted a dust-proofing member 331, such as with an adhesive, at a position facing the lateral side of the first or second disc cartridge 5 or 22. The mounting piece 333 is provided with a rotation assisting hole 337 passed through by a rotary pivot shaft, not shown, set upright on the base member 105, so that the mounting piece 333 is rotatably supported on the base member 105 in the direction indicated by arrows f1 and f2 in FIG. 16.

Partway in the longitudinal direction of the supporting piece 332, a first operating projection 335, abutted by the lift plate 232, is formed so as to be protruded towards the lateral side of the lift plate 232, as shown in FIG. 16. On the opposite side in the longitudinal direction of the supporting piece 332 is formed a second operating projection 336 abutted by the lift plate 232 and which is bent towards the lateral side of the lift plate 232.

Figure 17:
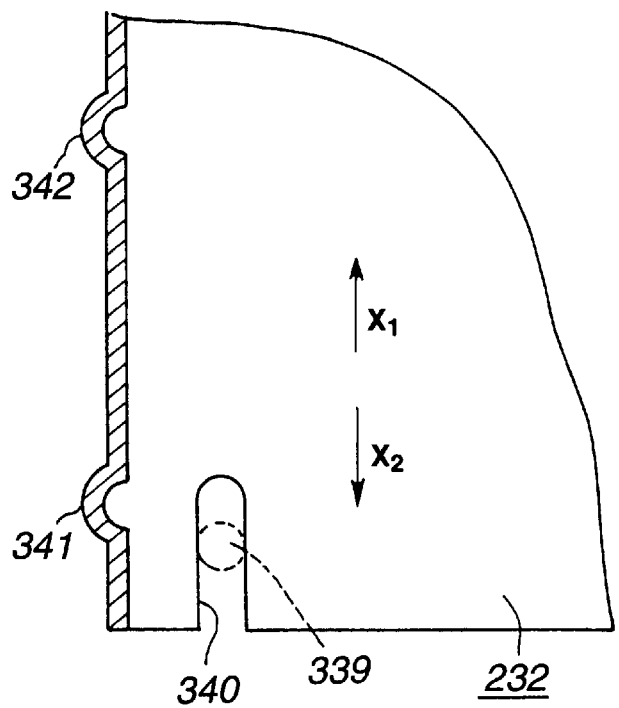
FIG. 17 is a plan view showing essential parts of the cartridge holder.

The lift plate 232, rotationally actuating the dust-proofing arms 292, 293, is mounted on the base member 105 for sliding in the direction indicated by arrows X1 and X2 in FIG. 17. In the bottom surface of the lift plate 232, there is formed a guide cut-out 340 movably engaged by a guide pin 339 set upright on the base member 105 so that the cut-out is opened in an end portion facing the cartridge insertion and/or removal opening 110.

Figure 18:
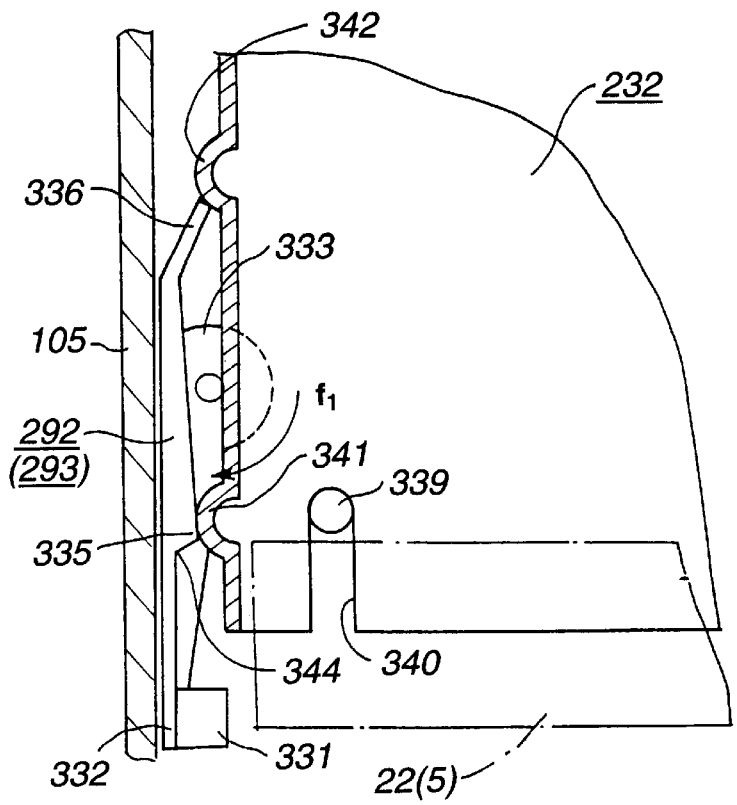
FIG. 18 is a plan view showing the state in which the dust-proofing arm is separated from the lateral side of the first or second disc cartridge.

A first operating projection 341, for thrusting the first actuating projection 335 of the dust-proofing arms 292,293, is provided for extending towards an outer side of the lateral surface of the lift plate 232, in an arcuate cross-section, as shown in FIG. 18. A second operating projection 342, for thrusting the second actuating projection 236 of the dust-proofing arm 292, 293 is provided for extending towards an outer side of or the lateral surface of the lift plate 232 in an arcuate cross-section at a pre-set distance from the first operating projection 341 along the movement direction of the lift plate 232.

The dust-proofing arms 292, 293 are formed with a cut-out 344 for clearance, at a position neighboring to the first actuating projection 335, in order to evade abetment against the first projection 341 of the lift plate 232, as shown in FIG. 16.

The operation of abutting the dust-proofing member 331 of the dust-proofing arms 292, 293 against the lateral surface of the first or second disc cartridge 5 or 22 when the first or second disc cartridge 5 or 22 is moved to the cartridge loading position is explained.

In the state in which the first or second disc cartridge 5 or 22 is not loaded in position, the first operating projection 341 of the lift plate 232 is abutted against the operating projection 335 of the dust-proofing arms 292, 293, as shown in FIG. 18.

The dust-proofing arms 292,293 has its first operating projection 335 thrust by the first projection 341 of the lift plate 232 and is thereby rotated in the direction indicated by arrow f1 in FIG. 18. Thus, the dust-proofing member 331 of the dust-proofing arms 292, 293 is receded away from the lateral surface of the first or second disc cartridge 5 or 22. On the other hand, the second operating projection 342 of the lift plate 232 is moved to a position not abutted by the second operating projection 336 of the dust-proofing arms 292, 293 in the state in which the first operating projection 341 of the lift plate 232 is abutted against the first operating projection 335 of the dust-proofing arms 292, 293.

Figure 19:
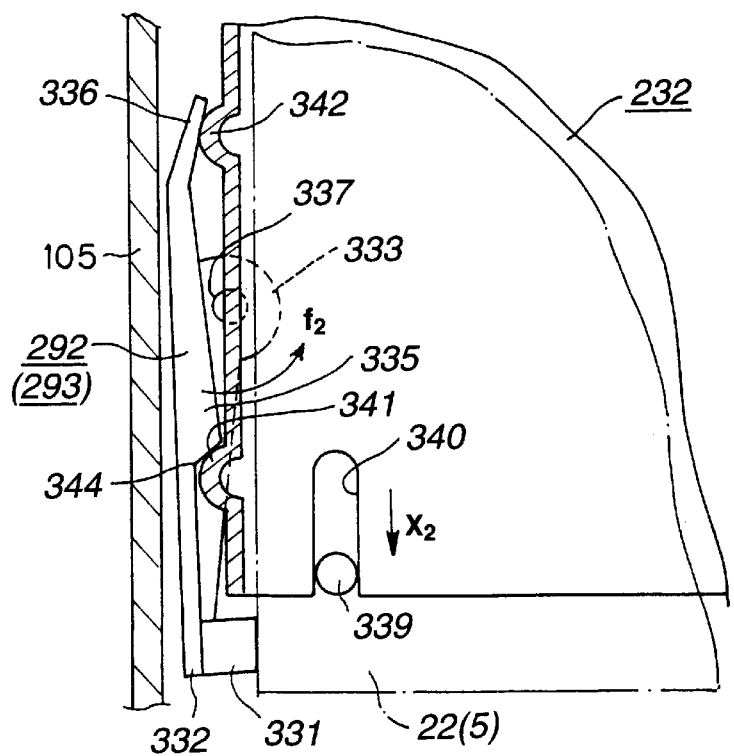
FIG. 19 is a plan view showing the state of abutting contact of the dust-proofing arm against the lateral side of the first or second disc cartridge.

When the first or second disc cartridge 5 or 22 is moved to the cartridge loading position, the lift plate 232 is moved in the direction indicated by arrow X2 in FIG. 19. As the lift plate 232 is moved in the direction indicated by arrow X2 in FIG. 19, the second operating projection 342 of the lift plate 232 is moved to a position of abutting against the second operating projection 336 of the dust-proofing arms 292,293, at the same time as the abutting state of the first operating projection 341 against the first operating projection 335 of the dust-proofing arms 292, 293 is cancelled so that the first projection 341 is moved into the clearance cut-out 344 of the dust-proofing arms 292, 293.

Thus, the second operating projection 336 of the dust-proofing arms 292, 293 is thrust by the second operating projection 342 of the lift plate 232 and thereby rotated in the direction indicated by arrow f2 in FIG. 19. Thus, the dust-proofing arms 292, 293 abut the dust-proofing member 331 against the lateral surface of the first or second disc cartridge 5 or 22 protruded from the inside of the cartridge holder 231. The dust-proofing member 331 is elastically deformed to prevent the dust and dirt from being intruded from this lateral side towards the main body unit 101 of the device.

That is, the first operating projection 341 of the lift plate 232 is abutted against the first operating projection 335 of the dust-proofing arms 292, 293, as shown in FIGS. 18 and 19. Alternatively, the second operating projection 342 of the lift plate 232 is abutted against the second operating projection 336 for bringing the dust-proofing member 331 into and out of contact with the lateral surface of the first or second disc cartridge 5 or 22.

Figure 20:
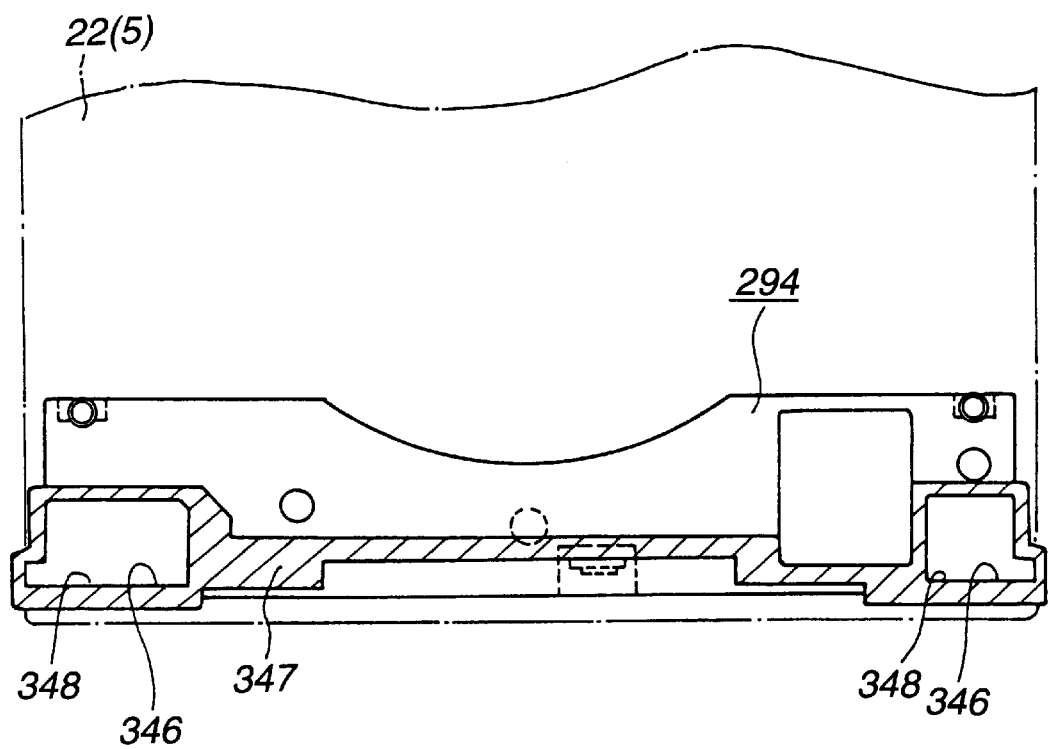
FIG. 20 is a plan view showing a dust-proofing plate provided on the dust-proofing mechanism.

A dust-proofing plate 294 of the dust-proofing mechanism 290 is formed of an elastic material, such as synthetic resin, into substantially a flat plate shape, and is arranged adjacent to the cartridge insertion and/or removal opening 110 on the base member 105 for facing the bottom surface of the first or second disc cartridge 5 or 22 loaded at the cartridge loading position. The dust-proofing plate 294 is formed with an opening 346 via which are inserted actuators for the disc-in detection switch 227 and first and second mistaken recording detection switches 228,229, as shown in FIGS. 6 and 20. This dust-proofing plate 294 is secured to the base member 105 via a set screw, not shown.

On the major surface of the dust-proofing plate 294, there is mounted a dust-proofing sheet 347, shown shaded in FIG. 20, for abutting against the bottom surface of the first or second disc cartridge 5 or 22 loaded on the cartridge loading position. The dust-proofing sheet 347 is formed of an elastic material elastically deformed to suit to the shape of the bottom surface of the first or second disc cartridge 5 or 22, and is formed by, for example, the sponge material or a non-woven cloth.

Figure 21:
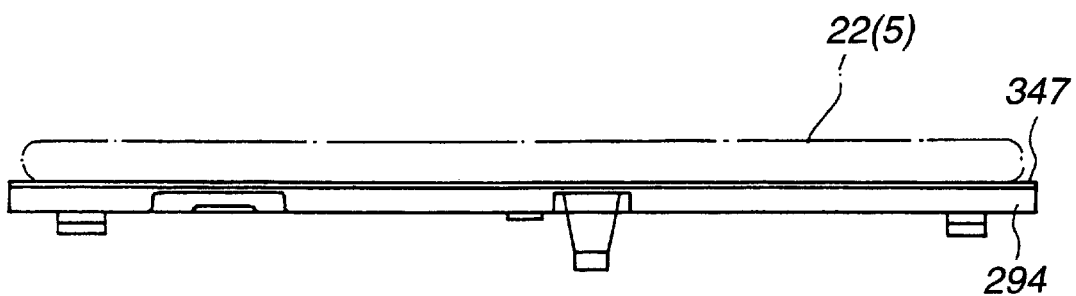
FIG. 21 is a side view showing the adust-proofing plate provided on a dust-proofing mechanism.

The dust-proofing sheet 347 is formed with an opening 348 corresponding to the opening 346 in the dust-proofing plate 294, and is sized to be slightly larger than the width of the main cartridge body unit 11 or 28 of the first or second disc cartridge 5 or 22, as shown in FIG. 20. The dust-proofing sheet 347 is arranged for extending along the width of the main cartridge body unit 11 or 28 of the first or second disc cartridge 5 or 22, loaded at the cartridge loading position, as shown in FIGS. 20 and 21, and is secured by an adhesive to the major surface of the dust-proofing plate 294.

When the first or second disc cartridge 5 or 22 is loaded at the cartridge loading position, the bottom surface of the main cartridge body unit 11 or 28 is set on the dust-proofing sheet 347 to cause elastic deformation of the dust-proofing sheet 347 to suit to the shape of the bottom surface of the main cartridge body unit 11 or 28. Thus, the dust-proofing sheet 347 positively prohibits the dust and dirt intruded via the cartridge insertion and/or removal opening 110 from entering the inside of the main body unit 101 of the device from the bottom side of the main cartridge body unit 11 or 28.

By having the dust-proofing mechanism 290, it is possible to prevent dust and 40 dirt reliably from entering the inside of the main body unit 101, in particular the vicinity of the head mechanism 116, via the cartridge inserting and removal opening 110.

In the present disc drive device 100, the first or second disc cartridge 5 or 22 housing the first or second magnetic disc 6 or 23 as an information recording medium is used. Of course, the cartridge may be removable from the main body unit 101, and provided with a magnetic head, to which is applied the magnetic field, such as a magneto-optical disc cartridge or the like recording medium cartridge.

In the second disc cartridge 22, used for the disc drive device 100, as shown in FIGS. 4 and 5, the detection hole 33 and the mistaken recording inhibiting hole 32 provided on the disc drive device 100 are designed as bottomed holes.

Figure 22:
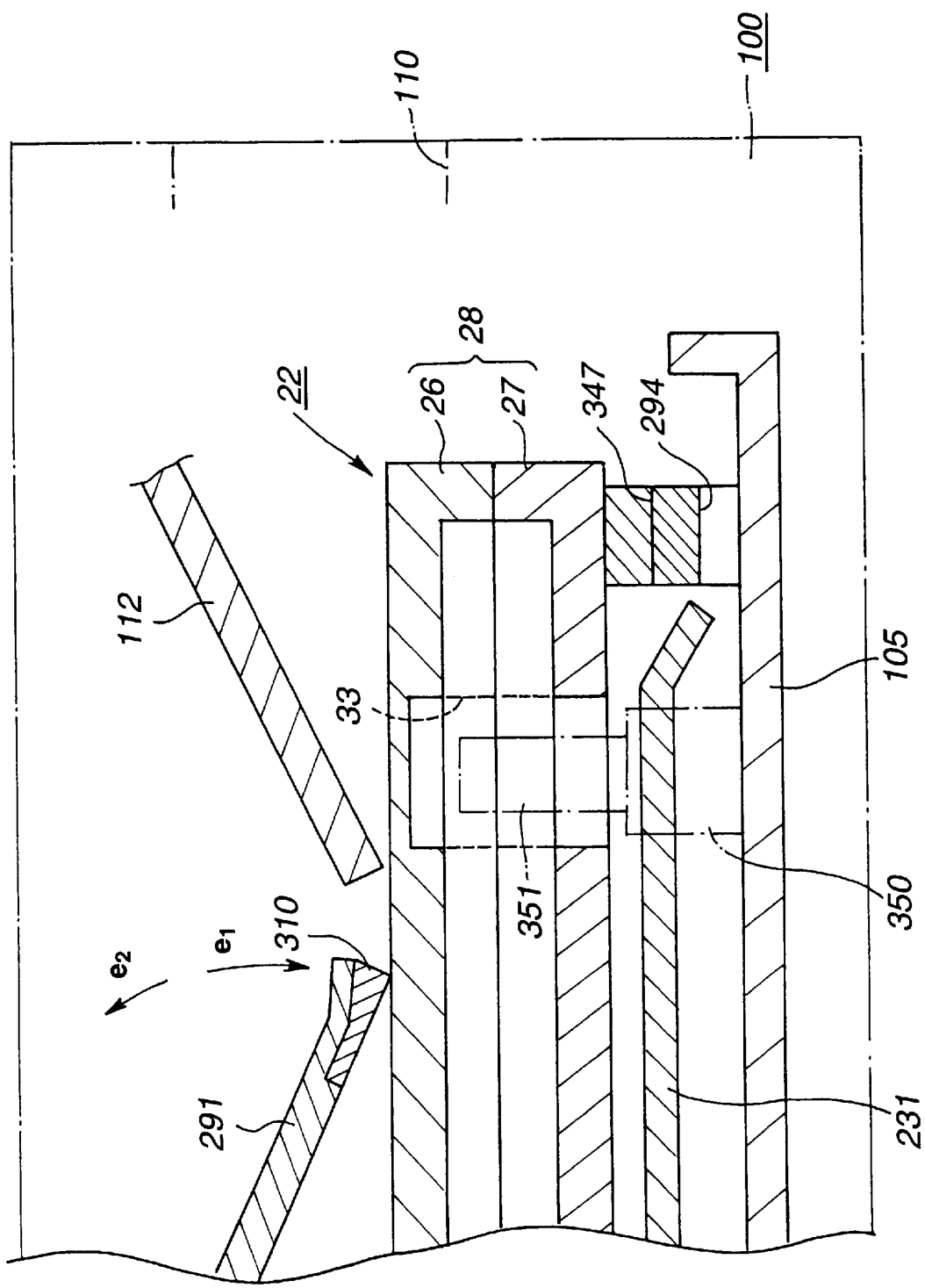
FIG. 22 is a longitudinal cross-sectional view for illustrating the dust-proofing mechanism.

The detection hole 33 is not a through-hole but is formed as a bottomed hole, with the side thereof towards the upper cartridge half 26 being closed, as shown in FIG. 22. Also, the detection hole 33 is of a sufficient depth not to be abutted by an actuator 351 of a detection switch 350 provided on the disc drive device 100.

Similarly to the detection hole 33, the mistaken recording inhibiting hole 32 is not a through-hole, but is a bottomed hole with the side thereof towards the upper cartridge half 26 being closed. The mistaken recording inhibiting member 36, movably engaged in the mistaken recording inhibiting hole 32, perpetually closes the mistaken recording inhibiting hole 32, without dependency upon an eventual movement position of the mistaken recording inhibiting member 36 representing the signal recordabilty for the second magnetic disc 23.

Thus, with the second disc cartridge 22, it is possible to prevent dust and dirt intruded via the cartridge insertion and/or removal opening 110 in the loaded state of the second disc cartridge 22 in position in the disc drive device 100 from being passed through the insides of the detection hole 33 and the mistaken recording inhibiting hole 32 to turn around to the bottom side of the main cartridge body unit 28 to enter the head mechanism 116 within the main body unit 101, as shown in FIG. 22. That is, with the second disc cartridge 22, reliability in the recording and/or reproducing operation is assured.

With the disc drive system, including the disc drive device 100 and the second disc cartridge 22, dust and dirt intruded via the cartridge insertion and/or removal opening 110 is prohibited by the dust-proofing mechanism 290 provided in the disc drive device 100 from entering the inside of the main body unit 101 from the rear major surface of the main cartridge body unit facing the cartridge insertion and/or removal opening 110, or from the lateral sides and bottom sides thereof, in the state in which the second disc cartridge 22 is loaded in position, as shown in FIG. 22.

In the second disc cartridge 22, loaded in position, the major surface of the main cartridge body unit 28 is acted on in the width-wise direction by the dust-proofing panel of the dust-proofing mechanism 290, both lateral sides of the main cartridge body unit 28 is acted on in the thickness direction by the dust-proofing arms 292, 293 of the dust-proofing mechanism 290 and the bottom side of the main cartridge body unit 28 is acted on along the width-wise direction by the dust-proofing plate 294 of the dust-proofing mechanism 290. This prevents intrusion of dust and dirt from the cartridge insertion and/or removal opening 110 to the side of the head mechanism 116 in the main body unit 101. On the other hand, with the second disc cartridge 22 loaded at the cartridge loading position, intrusion of dust and dirt is positively prevented via the detection hole 33 and the mistaken recording inhibiting hole 32 of the main cartridge body unit 28.

Thus, with the present disc driving system, since intrusion of dust and dirt via the cartridge insertion and/or removal opening 110 to the vicinity of the head unit 121 of the head mechanism 116 or to the vicinity of the signal recording surface of the second magnetic disc 23 is prohibited from occurring, it is possible to assure high reliability of the recording and/or reproducing operation of the second disc cartridge 22.

What is claimed is:

1. A dust-proofing mechanism in a disc drive system, said disc drive system comprising:

a main body unit;

said main body unit including an inserting and/or removal portion having an insertion and/or removal opening via which a disc cartridge housing a disc-shaped recording medium therein is inserted or removed;

a cartridge holder for holding said disc cartridge, arranged for movement between an inserting and/or removal position enabling said disc cartridge to be inserted into and removed from said main body unit via said inserting and/or removal portion and a loading position enabling information signals to be recorded and/or reproduced for said disc-shaped recording medium; and a first dust-proofing member for a major surface of said disc cartridge, a second dust-proofing member for lateral surfaces of said disc cartridge and a third dust-proofing member for a bottom surface of said disc cartridge, arranged facing said major surface, lateral surfaces and said bottom surface of said disc cartridge, mounted at said cartridge loading position, respectively, for prohibiting intrusion of dust and dirt via said insertion and/or removal opening into said main body unit;

said disc cartridge having a main cartridge body unit including a detection hole for detecting specifications of said disc-shaped recording medium housed therein on insertion of detection means provided on said disc drive device;

said detection hole having an end along a depth-wise direction closed so as to have a depth sufficient to prohibit said detection means inserted therein from abutting against a bottom of said detection hole thereof.

2. The dust-proofing mechanism in said disc driving system according to claim 1 wherein said main cartridge body unit is rectangular in profile and wherein said detection hole is positioned near one corner of said main cartridge body unit.

3. The dust-proofing mechanism in the disc driving system according to claim 1 wherein said detection hole is positioned on a rear end along the direction of insertion of said disc cartridge into said disc drive system.

4. The dust-proofing mechanism in the disc driving system according to claim 1 wherein said main cartridge body unit of said disc cartridge includes a mistaken recording inhibiting hole for prohibiting inadvertent recording of information signals on said disc-shaped recording medium and a slider mounted for sliding movement in said mistaken recording inhibiting hole, and wherein said mistaken recording inhibiting hole is configured so as to be perpetually closed without dependency on an eventual position of said slider movement.

5. The dust-proofing mechanism according to claim 4 wherein the disc cartridge is rectangular in profile wherein said mistaken recording inhibiting hole is positioned near one corner of said disc cartridge thereof.

* * * * *